United States Patent
Wang et al.

(10) Patent No.: US 12,212,767 B2
(45) Date of Patent: Jan. 28, 2025

(54) VIDEO DECODING METHOD AND APPARATUS, VIDEO ENCODING METHOD AND APPARATUS, AND DEVICE AND STORAGE MEDIUM

(71) Applicant: TENCENT TECHNOLOGY (SHENZHEN) COMPANY LIMITED, Guangdong (CN)

(72) Inventors: Yingbin Wang, Guangdong (CN); Xiaozhong Xu, Guangdong (CN); Shan Liu, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 149 days.

(21) Appl. No.: 17/889,870

(22) Filed: Aug. 17, 2022

(65) Prior Publication Data
US 2022/0394285 A1    Dec. 8, 2022

Related U.S. Application Data

(63) Continuation of application No. PCT/CN2021/109390, filed on Jul. 29, 2021.

(30) Foreign Application Priority Data

Aug. 10, 2020 (CN) .......................... 202010794517.8

(51) Int. Cl.
*H04N 19/44* (2014.01)
*H04N 19/139* (2014.01)
(Continued)

(52) U.S. Cl.
CPC ........... *H04N 19/44* (2014.11); *H04N 19/139* (2014.11); *H04N 19/176* (2014.11); *H04N 19/513* (2014.11)

(58) Field of Classification Search
CPC .............................. H04N 19/44; H04N 19/139
(Continued)

(56) References Cited

U.S. PATENT DOCUMENTS

2015/0350674 A1* 12/2015 Laroche ................. H04N 19/52
375/240.16

FOREIGN PATENT DOCUMENTS

| CN | 101794445 A | 8/2010 |
|---|---|---|
| CN | 104980760 A | 10/2015 |
| CN | 108462873 A | 8/2018 |

OTHER PUBLICATIONS

Written Opinion issued Oct. 21, 2021 in International Application No. PCT/CN2021/109390.
(Continued)

*Primary Examiner* — Amir Shahnami
(74) *Attorney, Agent, or Firm* — Sughrue Mion, PLLC

(57) ABSTRACT

A video decoding method and apparatus, a video encoding method and apparatus, a computer device, and a storage medium, which belong to the field of video processing. The video decoding method includes: performing classification on a displacement vector of a decoded block in a historical motion information list according to a following classification method, the classification method comprising: in a case that the decoded block satisfies a classification condition of any class of a plurality of classes, adding the displacement vector of the decoded block to the class, and stopping performing classification on the displacement vector of the decoded block.

20 Claims, 9 Drawing Sheets

---

During video decoding, a decoder side performs classification on a decoded block in a historical displacement vector list, and during classification, in a case that the decoded block satisfies a classification condition of any class of a plurality of classes, adds a displacement vector of the decoded block to the class — 501

The decoder side stops performing classification on the decoded block — 502

(51) Int. Cl.
*H04N 19/176* (2014.01)
*H04N 19/513* (2014.01)

(58) Field of Classification Search
USPC .................................................. 375/240.16
See application file for complete search history.

(56) References Cited

OTHER PUBLICATIONS

Extended European Search Report issued Jul. 4, 2023 in European Application No. 21855378.2.
Chun-Chi Chen et al., "Intra Line Copy for HEVC Screen Content Intra-Picture Prediction", IEEE Transactions on Circuits and Systems for Video Technology, Jul. 2017, vol. 27, No. 7, pp. 1568-1579 (12 pages total).
Ken Lawrence, "AVS3 AVS3—Part 2: Video", Draft text of AVS3 specification for DVB member preview, National Standard of the People's Republic of China, 2021, pp. 1-397 (403 pages total).
International Search Report for PCT/CN2021/109390 dated Oct. 21, 2021.

\* cited by examiner

VIDEO DECODING METHOD AND APPARATUS, VIDEO ENCODING METHOD AND APPARATUS, AND DEVICE AND STORAGE MEDIUM

CROSS-REFERENCE TO RELATED APPLICATION(S)

This application is a continuation application of International Application No. PCT/CN2021/109390, filed Jul. 29, 2021, which claims priority to Chinese Patent Application No. 202010794517.8, filed with the China National Intellectual Property Administration on Aug. 10, 2020, the disclosures of each being incorporated by reference in their entireties.

FIELD

The present disclosure relates to the field of video processing, and in particular, to a video decoding method and apparatus, a video encoding method and apparatus, a computer device, and a storage medium.

BACKGROUND

With the development of network technology, more and more users watch videos through various types of terminals. Limited by a network bandwidth, a video obtained by the terminal is often compressed, that is, an encoded video. Therefore, when the terminal plays the video, the video needs to be decoded.

In the related art, when the terminal decodes the video, a displacement vector corresponding to a to-be-decoded block needs to be classified, and the to-be-decoded block is decoded based on the classified displacement vector. However, one displacement vector may correspond to a plurality of types, resulting in high decoding complexity.

SUMMARY

Embodiments of the disclosure may provide a video decoding method and apparatus, a video encoding method and apparatus, a computer device, and a storage medium. The technical solutions are as follows.

According to an aspect, a video decoding method, performed by a computer device, may be provided, the method including: performing classification on a displacement vector of a decoded block in a historical motion information list according to a following classification method, the classification method including: in a case that the any decoded block satisfies a classification condition of any class of a plurality of classes, adding the displacement vector of the decoded block to the any class, and stopping performing classification on the displacement vector of the decoded block.

According to an aspect, a video encoding method, performed by a computer device, may be provided, the method including: performing classification on a displacement vector of an encoded block in a historical motion information list according to a following classification method, the classification method including: in a case that the any encoded block satisfies a classification condition of any class of a plurality of classes, adding the displacement vector of the encoded block to the any class, and stopping performing classification on the displacement vector of the encoded block.

According to an aspect, a video decoding apparatus may be provided, including: a decoded block classification module, configured to perform classification on a displacement vector of a decoded block in a historical motion information list according to a following classification method, the classification method including: in a case that the decoded block satisfies a classification condition of any class of a plurality of classes, adding the displacement vector of the decoded block to the class, and stopping performing classification on the displacement vector of the decoded block.

According to an aspect, a video encoding apparatus may be provided, including: an encoded block classification module, configured to perform classification on a displacement vector of an encoded block in a historical motion information list according to a following classification method, the classification method including: in a case that the encoded block satisfies a classification condition of any class of a plurality of classes, adding the displacement vector of the encoded block to the class, and stopping performing classification on the displacement vector of the encoded block.

According to an aspect, a computer device may be provided, including one or more processors and one or more memories, the one or more memories storing at least one computer program, the computer program being loaded and executed by the one or more processors to implement the operations performed in the methods according to the foregoing aspects.

According to one aspect, a computer-readable storage medium may be provided, storing at least one computer program, the computer program being loaded and executed by a processor to implement the operations performed in the methods according to the foregoing aspects. According to an aspect, a computer program product may be provided, the computer program product including a computer program, the computer program being stored in a computer-readable storage medium, a processor of a computer device reading the computer program from the computer-readable storage medium, and the processor executing the computer program to cause the computer device to implement the operations performed in the methods according to the foregoing aspects.

BRIEF DESCRIPTION OF THE DRAWINGS

To describe the technical solutions of example embodiments of this disclosure more clearly, the following briefly introduces the accompanying drawings for describing the example embodiments. The accompanying drawings in the following description show only some embodiments of the disclosure, and a person of ordinary skill in the art may still derive other drawings from these accompanying drawings without creative efforts. In addition, one of ordinary skill would understand that aspects of example embodiments may be combined together or implemented alone.

DESCRIPTION OF EMBODIMENTS

To make the objectives, technical solutions, and advantages of the present disclosure clearer, the following further describes the present disclosure in detail with reference to the accompanying drawings. The described embodiments are not to be construed as a limitation to the present disclosure. All other embodiments obtained by a person of ordinary skill in the art without creative efforts shall fall within the protection scope of the present disclosure.

The terms "first", "second", and the like are used for distinguishing between same items or similar items of which effects and functions are basically the same. It is to be understood that, the "first", "second", and "nth" do not have a dependency relationship in logic or time sequence, and a quantity and an execution order thereof are not limited.

The term "at least one" refers to one or more, and the meaning of "plurality" refers to two or more. For example, a plurality of to-be-encoded blocks refers to two or more to-be-encoded blocks.

First, terms involved in the embodiments are introduced as follows:

Motion compensation: Motion compensation is a commonly used prediction method for video coding. The motion compensation is based on the characteristic of redundancy of video content in a time domain or a space domain, and exports a predicted value of a displacement vector of a to-be-encoded block according to the encoded block. In an encoding process, a pixel value of the to-be-encoded block can be replaced by a pixel value of the encoded block, and the displacement vector of the to-be-encoded block can be recorded, so that the encoding of the to-be-encoded block can be implemented.

The motion compensation is divided into: inter frame prediction, intra block copy prediction, and intra string copy prediction. In the encoding process, the prediction methods may be used alone or in combination.

Figure 1:
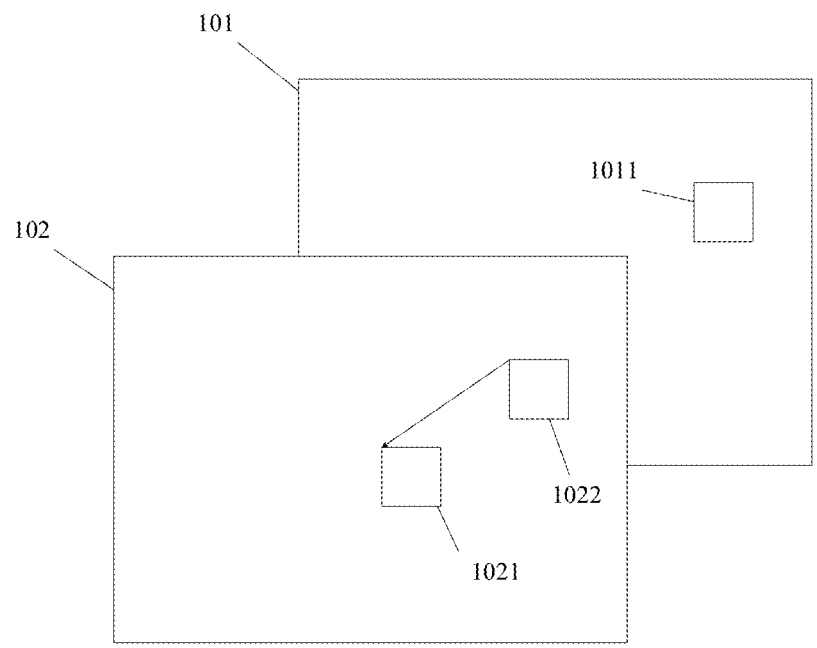
FIG. 1 is a schematic diagram of a motion vector according to some embodiments.

For inter frame prediction, a displacement vector is referred to as a motion vector (MV). By using the correlation of video content in the time domain, the inter frame prediction predicts a pixel of the to-be-encoded block by using a pixel of an adjacent encoded block, so as to effectively remove the redundancy of the time domain of a video. FIG. 1 is a schematic diagram of a motion vector according to some embodiments. Referring to FIG. 1, 101 is a to-be-encoded frame, 102 is a reference frame, an encoded block 1011 is a to-be-encoded block, and an encoded block 1021 is a reference block of the encoded block 1011. Coordinates of the encoded block 1022 and the encoded block 1011 in the image are the same, the coordinates of the encoded block 1021 are $(x_r, y_r)$, and the coordinates of the encoded block 1022 are $(x, y)$. Displacement between the encoded block 1021 and the encoded block 1022 is the motion vector, that is: $MV=(x_r-x, y_r-y)$-.

For the intra block copy (IBC) prediction, the displacement vector is referred to as a block vector (BV). By using the correlation of video content in space, the intra block copy predicts the pixel of the to-be-encoded block by using the pixel of the encoded block on the current image, which can effectively save bits required for encoding the pixel. Displacement between the current encoded block and a reference block of the current encoded block in the IBC is referred to as the block vector (BV).

Figure 2:
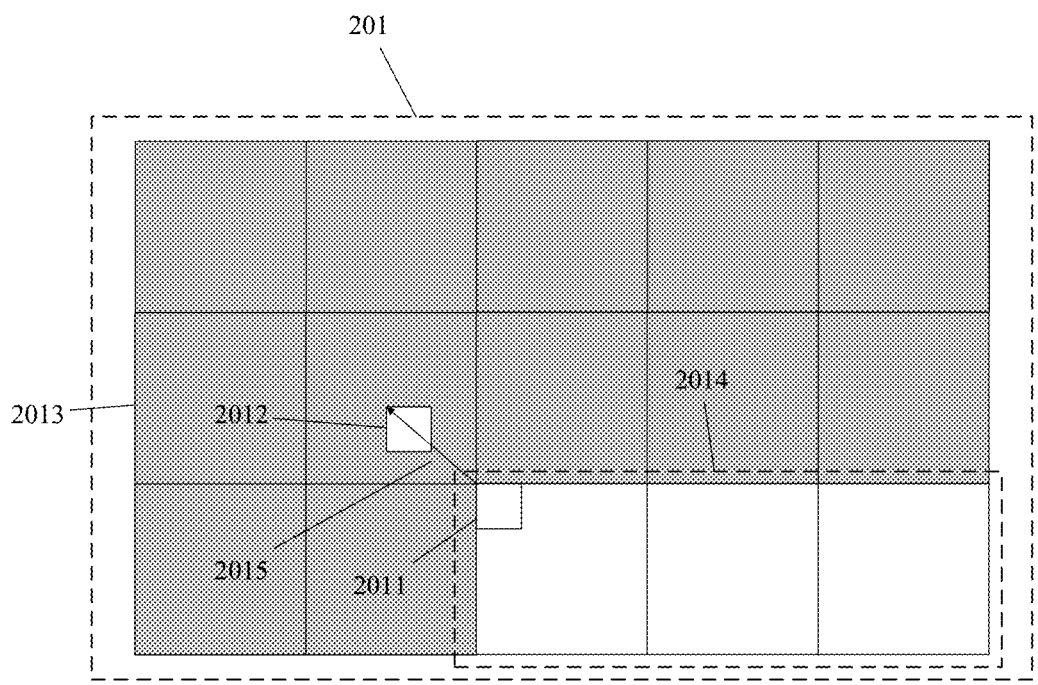
FIG. 2 is a schematic diagram of a block vector according to some embodiments

FIG. 2 is a schematic diagram of a block vector according to some embodiments. Referring to FIG. 2, 201 is a current frame, 2011 is a to-be-encoded block, 2012 is an encoded block, 2013 is an encoded area, 2014 is a to-be-encoded area, and 2015 is a block vector.

For intra string copy (ISC), the displacement vector is referred to as a string vector (SV). In a specific scanning order (raster scan, round trip scan, zig-zag scan, or the like), an encoded block is divided into a series of pixel strings or unmatched pixels. Similar to the IBC, each to-be-encoded string searches for an encoded string with the same shape in the encoded area of the current image, and exports a predicted value of the current string, which can effectively save bits.

Figure 3:
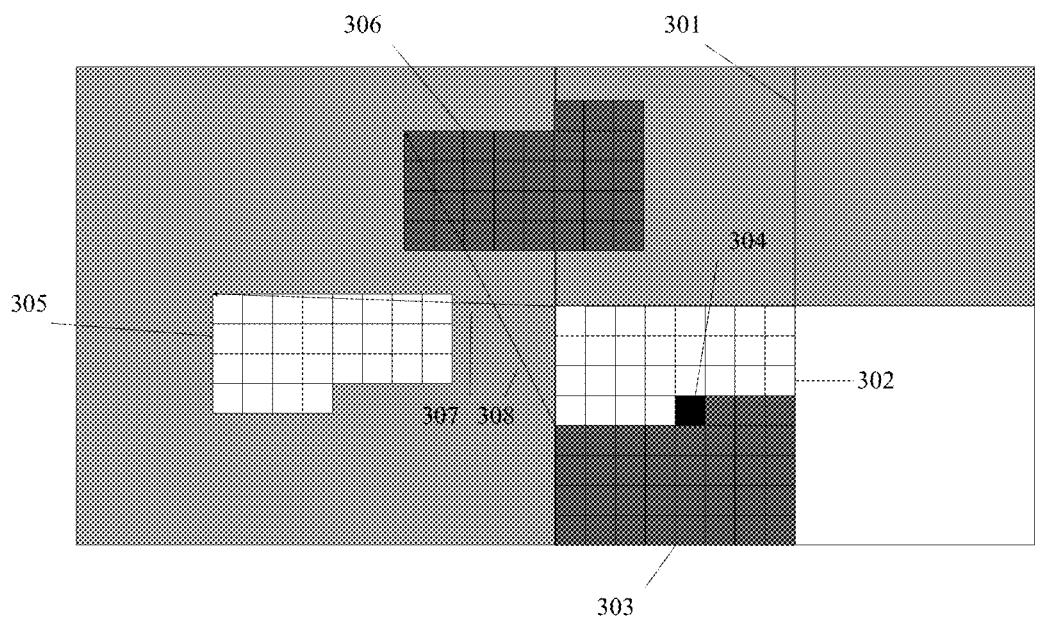
FIG. 3 is a schematic diagram of a string vector according to some embodiments.

FIG. 3 is a schematic diagram of a string vector according to some embodiments. Referring to FIG. 3, an area 301 is an encoded area, 28 white pixels are a to-be-encoded string 302, 35 gray pixels are a to-be-encoded string 303, and 1 black pixel represents an unmatched pixel 304. 305 is an encoded string corresponding to the to-be-encoded string 302, 306 is an encoded string corresponding to the to-be-encoded string 303, 307 is a string vector between the to-be-encoded string 302 and the encoded string 305, and 308 is a string vector between the to-be-encoded string 303 and the encoded string 306.

The video encoding method and the video decoding method provided in some embodiments can be applicable to the context of a plurality of video encoding standards, for example, applicable to a Versatile Video Coding standard (VVC/H.266), and can also be applicable to an Audio Video Coding Standard 3 (AVS3), which is not limited thereto. In an example embodiment, H.266/VVC may further save the bits required to encode the BV by using a BV prediction technology similar to the inter frame prediction.

Figure 4:
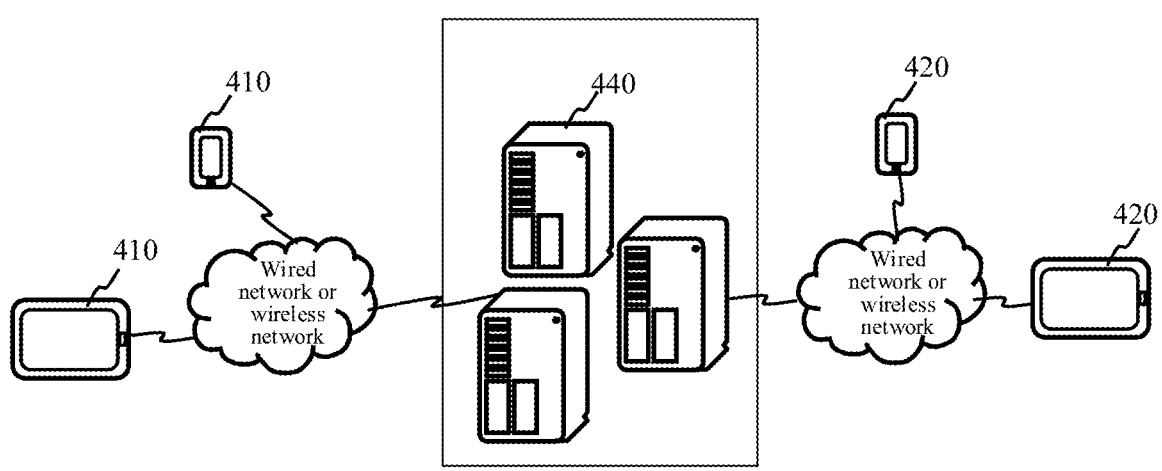
FIG. 4 is a schematic diagram of an implementation environment of a video decoding method according to some embodiments.

FIG. 4 is a schematic diagram of an implementation environment of a video encoding method according to some embodiments. Referring to FIG. 4, the implementation environment may include a first terminal 410, a second terminal 420, and a server 440.

In some embodiments, the first terminal 410 can be connected to the second terminal 420 through a wireless network or a wired network. The first terminal and the second terminal may be a smartphone, a tablet computer, a notebook computer, a desktop computer, a smart speaker, a smart watch, or the like, but is not limited thereto. An application program supporting video encoding is installed and run on the first terminal 410, and the first terminal 410 may also be referred to as an encoder side. An application program supporting video decoding is installed and run on the second terminal 420, and the second terminal 420 may also be referred to as a decoder side. After encoding the video, the first terminal 410 can transmit the encoded video to the second terminal 420, and the second terminal can decode the encoded video.

In an example embodiment, the first terminal 410 and the second terminal 420 are both terminals capable of encoding and decoding, which are not limited thereto.

In some embodiments, the first terminal 410 and the second terminal 420 can be connected to the server 440 by using a wireless network or a wired network. After encoding the video, the first terminal 410 can transmit the encoded video to the server 440, the server 440 delivers the encoded video to the second terminal 420, and the second terminal can decode the encoded video.

In some embodiments, the server 440 is an independent physical server, or is a server cluster or a distributed system formed by a plurality of physical servers, or is a cloud server that provides a basic cloud computing service such as a cloud service, a cloud database, cloud computing, a cloud function, cloud storage, a network service, cloud communication, a middleware service, a domain name service, a security service, a content delivery network (CDN), big data, and an artificial intelligence platform.

Certainly, the server 440 can also directly encode the video, and deliver the encoded video to the first terminal 410 or the second terminal 420, which is not limited thereto.

To more clearly describe the video encoding method and the video decoding method provided in some embodiments, application scenarios of the video encoding method and the video decoding method are first introduced.

An example embodiment, can be applicable in a scenario of a local video. An encoder side encodes the video, and transmits the encoded video to a decoder side. The decoder side decodes the encoded video, plays the decoded video, and the user can watch the video through the decoder side. In some embodiments, the encoder side is a terminal used by a video author. In some embodiments, after encoding the video, the encoder side can transmit the encoded video to the decoder side through the network, or through the storage medium. For example, compact disc read-only memory (CD-ROM), high-density digital video disc (DVD), and memory stick transmit the encoded video to the decoder side.

Some embodiments can be applicable to a process of online video playback. After encoding the video, the encoder side can upload the encoded video to the server, and the server transmits the encoded video to the decoder side. The decoder side decodes the encoded video, plays the decoded video, and the user can watch the video through the decoder side. In some embodiments, the encoder side is a terminal used by a video author.

Some embodiments can be applicable in a scenario of a video call, for example, in a scenario of an online conference. Using the online conference as a conference between two users as an example, the two users conduct the online conference by respectively using terminals capable of both video encoding and video decoding. During a conference, a terminal collects a video stream, encodes the collected video stream, and transmits the encoded video stream to a server. The server is also a server of the online conference, and the video stream includes a plurality of video images. The server transmits the encoded video stream to another terminal, the another terminal decodes the encoded video stream, and the user of the another terminal can view the video stream. Certainly, the another terminal can also collect the video stream, encode the video stream, and transmit the video stream to the server, and the server forwards the video stream, so that the online conference between the two users can be implemented. Additionally, based on the foregoing description, the online conference can also be extended to an online conference among a plurality of users, which is not limited thereto.

Some embodiments can be applicable to a scenario of livestream. A host terminal collects a livestreaming video stream, encodes the collected livestreaming video stream, and transmits the encoded livestreaming video stream to the server, where the livestreaming video stream includes a plurality of livestreaming images, and a livestreaming terminal is also the encoder side. The server transmits the encoded livestreaming video stream to a viewer terminal. The viewer terminal is also the decoder side, or the server decodes the encoded livestreaming video stream, encodes the livestreaming video stream according to different bit rates, and then transmits the encoded livestreaming video stream to the viewer terminal, which is not limited thereto.

In the following process of describing the technical solutions, a terminal is used as an execution body as an example. In other possible implementations, a server may also be used as an execution body to execute the technical solutions, and types of execution bodies are not limited thereto.

Figure 5:
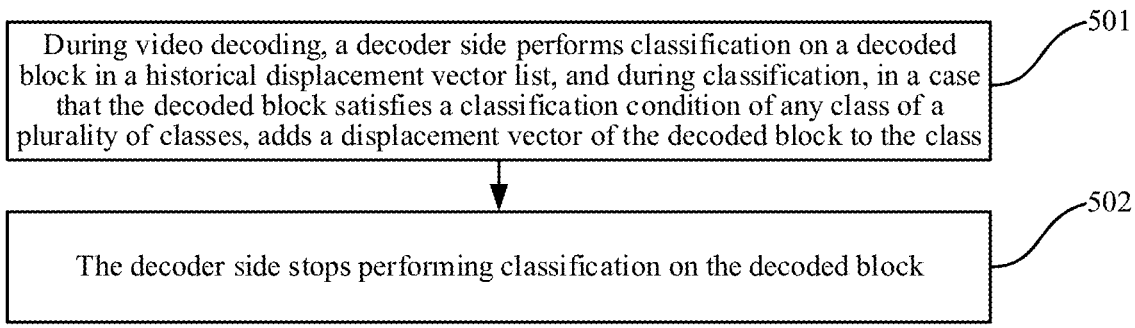
FIG. 5 is a flowchart of a video decoding method according to some embodiments.

FIG. 5 is a flowchart of a video decoding method according to some embodiments, the method includes the following operations.

501. A decoder side performs classification on a displacement vector of a decoded block in a historical motion information list according to a following classification method, the classification method including: in a case that the decoded block satisfies a classification condition of any class of a plurality of classes, adding the displacement vector of the decoded block to the class.

The historical motion information list may also be referred to as a history based motion vector prediction list (HMVP). In some embodiments, the displacement vector of the decoded block is stored in the historical motion information list, and auxiliary information used for performing classification on the displacement vector is further stored in the historical motion information list. The auxiliary information includes size information and position information of the decoded block, and a quantity of reuse times of the displacement vector of the decoded block.

502. A decoder side stops performing classification on the displacement vector of the decoded block.

In the technical solutions provided in some embodiments, in a process of performing classification on the displacement vector in the historical motion information list on the decoder side, once the displacement vector of the decoded block is added to a class, the decoder side does not continue performing classification on the displacement vector of the decoded block, but stops performing classification on the displacement vector of the decoded block. In this way, a situation in which a displacement vector is classified into a plurality of classes can be avoided, so that an operation of duplication checking is not required when constructing a candidate displacement vector list, the complexity of video decoding is reduced, and the efficiency of video decoding is improved.

Figure 6:
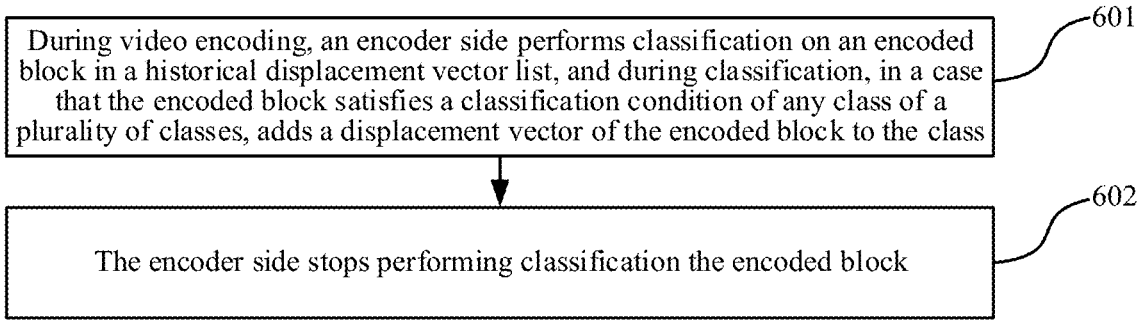
FIG. 6 is a flowchart of a video encoding method according to some embodiments.

FIG. 6 is a flowchart of a video decoding method according to some embodiments, the method includes the following operations.

601. An encoder side performs classification on a displacement vector of an encoded block in a historical motion information list according to the following classification method, where the classification method includes: in a case that the encoded block satisfies a classification condition of any class of a plurality of classes, adding the displacement vector of the encoded block to the class.

602. An encoder side stops performing classification on the displacement vector of the encoded block.

In the technical solutions provided in some embodiments, in a process of performing classification on the displacement vector in the historical motion information list on the encoder side, once the displacement vector of the encoded block is added to a class, the encoder side does not continue performing classification on the displacement vector of the encoded block, but stops performing classification on the displacement vector of the encoded block. In this way, a situation in which a displacement vector is classified into a plurality of classes can be avoided, so that an operation of duplication checking is not required when constructing a candidate displacement vector list, the complexity of video encoding is reduced, and the efficiency of video encoding is improved.

The foregoing operations 501 to 502 and operations 601 to 602 are brief descriptions of the technical solutions provided in some embodiments, and the technical solutions are described in detail below with reference to some examples. Since the video decoding method and the video encoding method belong to the same inventive concept, in the following description process, the video decoding method will be described first. In the description process, for ease of understanding, the quantity of to-be-decoded blocks being one is used as an example. In the decoding process, a plurality of to-be-decoded blocks can be decoded, and the method for decoding the plurality of to-be-decoded blocks is the same as the process for decoding one to-be-decoded block.

Figure 7:
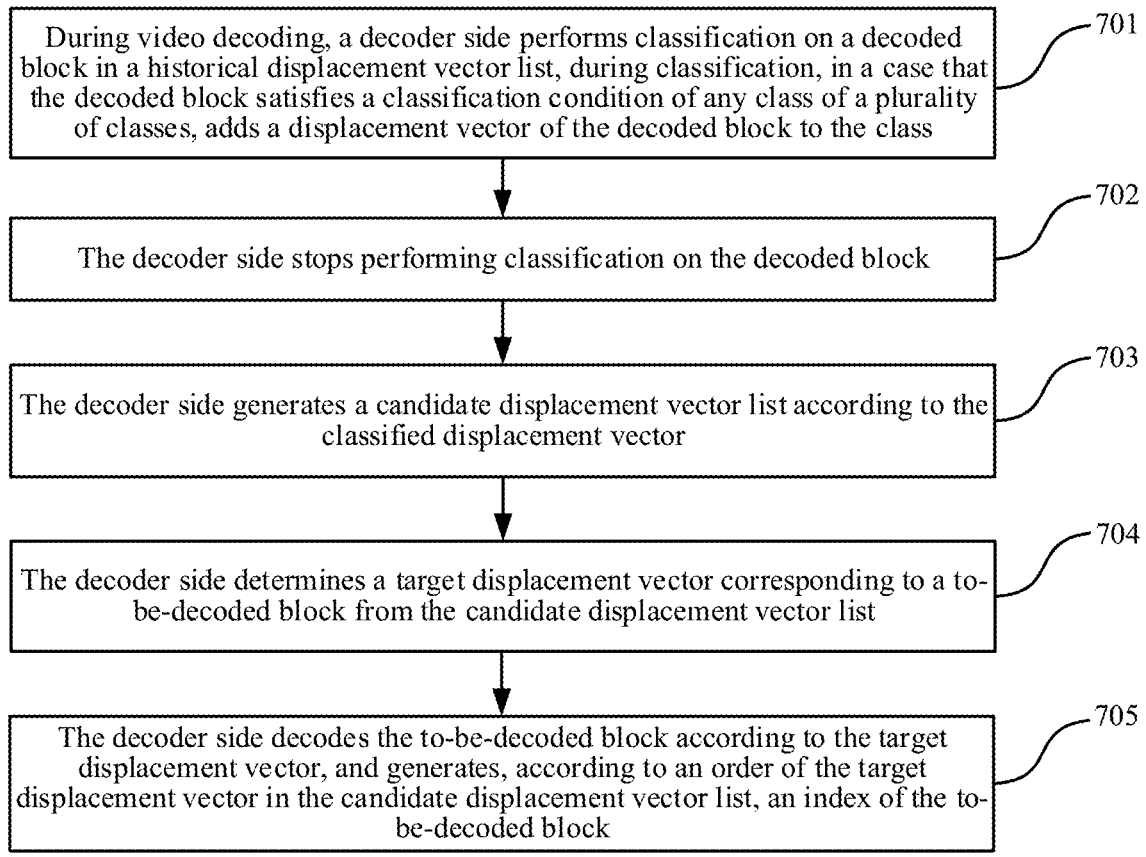
FIG. 7 is a flowchart of a video decoding method according to some embodiments.

FIG. 7 is a flowchart of a video decoding method according to some embodiments, the method includes the following operations.

701. A decoder side performs classification on a displacement vector of a decoded block in a historical motion information list according to a following classification method, the classification method including: in a case that the decoded block satisfies a classification condition of any class of a plurality of classes, adding the displacement vector of the decoded block to the class.

The historical motion information list is a list with a limited length. When the historical motion information list is filled and simultaneously a new displacement vector is to be added to the historical motion information list, the displacement vector that first enters the historical motion information list is removed to make room for a new displacement vector. In some embodiments, the storage manner is referred to as first input first output (FIFO).

A length of the historical motion information list is related to the video decoding standard, such as 6, 8, or 12. Certainly, with the update of the video decoding standard, the length of the historical motion information list is also updated accordingly, which is not limited thereto.

In addition, the displacement vectors stored in the historical motion information list correspond to different sequence numbers, the sequence numbers are configured to represent the corresponding displacement vectors, and the decoder side can identify the displacement vectors in the historical motion information list through the sequence numbers. If a length of the historical motion information list is 3, the displacement vectors stored in the historical motion information list respectively correspond to sequence numbers 0, 1, and 2. In a subsequent process of performing classification on the displacement vectors, the decoder side can both perform classification on the displacement vectors in a positive order, that is, an order of 0→1→2, and perform classification on the displacement vectors in a reverse order, that is, an order of 2→1→0, which is not limited thereto.

In some embodiments, the decoder side may perform classification on the displacement vector of the decoded block according to auxiliary information of the decoded block stored in the historical motion information list. During classification, the decoder side compares the auxiliary information of the decoded block with classification conditions of a plurality of classes. In response to the auxiliary information of the decoded block satisfying the classification condition of any class of the plurality of classes, the decoder side adds the displacement vector of the decoded block to the class.

In addition, before adding the displacement vector of the decoded block to the class, if the displacement vector of the decoded block is stored in the historical motion information list, the decoder side determines whether a displacement vector that is the same as the displacement vector of the decoded block is included in the historical motion information list. In response to the same displacement vector as the displacement vector of the decoded block being included in the historical motion information list, for example, denoting the same displacement vector as the displacement vector of the decoded block as A, then the terminal removes the displacement vector A from the historical motion information list, adds the displacement vector of the decoded block to the historical motion information list, and simultaneously adds the quantity of use times of the displacement vector of the decoded block by one.

Next, descriptions of a method for performing classification on the displacement vector of the decoded block based on the auxiliary information on the decoder side are made by using an example in which classification conditions may be a size of the decoded block is greater than or equal to a size threshold, a quantity of use times of the displacement vector of the decoded block is greater than a times threshold, and a spatial positional relationship between the decoded block and a to-be-decoded block satisfies a position condition.

First, based on the classification conditions, 7 classes are set, and classification conditions of the 7 classes are respectively as follows:

Class 0: An area of the decoded block is greater than or equal to 64 pixels;

Class 1: A quantity of use times of the BV is greater than or equal to 2;

Class 2: Coordinates of an upper left corner of the decoded block are located to the left of coordinates of an upper left corner of the to-be-decoded block;

Class 3: Coordinates of an upper left corner of the decoded block are located above coordinates of an upper left corner of the to-be-decoded block;

Class 4: Coordinates of an upper left corner of the decoded block are located at the upper left of coordinates of an upper left corner of the to-be-decoded block;

Class 5: Coordinates of an upper left corner of the decoded block are located at the upper right of coordinates of an upper left corner of the to-be-decoded block; and Class 6: Coordinates of an upper left corner of the decoded block are located at the lower left of coordinates of an upper left corner of the to-be-decoded block.

A sequence number of each class is an order in which the decoder side performs classification on the displacement vector of the decoded block based on the auxiliary information, that is, in the classification process, the decoder side first compares the auxiliary information of the decoded block with the classification condition of the class 0. If the auxiliary information of the decoded block does not satisfy the classification condition of the class 0, the decoder side compares the auxiliary information of the decoded block with the classification condition of the class 1, and so on.

The classification conditions corresponding to class 0 to class 6 are only provided for being used as an example. As the video decoding standard is updated, the quantity of classes and the classification conditions corresponding to the classes can be updated accordingly.

In addition, each class corresponds to a list used for storing displacement vectors. In response to the displacement vector of the any decoded block being classified into the any class, the decoder side adds the displacement vector of the decoded block to a list corresponding to the class. When the decoder side fills the displacement vector in the list, the decoder side can also simultaneously number the displacement vectors in the list. The decoder side determines a sequence number of the displacement vector newly entering the list as 1, and adds the sequence number of the displacement vector that enters the list before by one. For example, only one displacement vector A is included in the list, and the sequence number of the displacement vector A in the list is 1. When the decoder side fills a displacement vector B into the list, the decoder side sets a sequence number of the displacement vector B to 1, and updates the sequence number of the displacement vector A to 2. In the list corresponding to each class, the displacement vector whose sequence number being 1 is a candidate displacement vector corresponding to the class, and the candidate displacement vector is also the displacement vector used for generating a candidate displacement vector list subsequently.

In some embodiments, a newly added displacement vector may also only be stored in the list corresponding to each class. That is, in the list corresponding to each class, only the latest displacement vector that satisfies the classification condition is recorded. For example, if there is a displacement vector C that satisfies the classification condition in the list, when a new displacement vector D that satisfies the classification condition enters the list, the decoder side deletes the displacement vector C from the list, and only stores the displacement vector D.

After setting the class and the classification condition corresponding to the class, the decoder side can perform classification on the displacement vector of the decoded block according to the auxiliary information of the decoded block. Descriptions are made with reference to several examples.

Using the class 0 as an example, after a displacement vector and auxiliary information of a decoded block A enter the historical motion information list, the decoder side obtains size information of the decoded block A from the auxiliary information of the decoded block A, such as 4×4, that is, an area of the decoded block A is 16 pixels. Because 16 pixels is less than 64 pixels, the decoder side determines that the decoded block A does not satisfy the classification condition of the class 0, and does not classify the decoded block A into the class 0. After a displacement vector and auxiliary information of a decoded block B enter the historical motion information list, the decoder side obtains size information of the decoded block B from the auxiliary information of the decoded block B, such as 8×8, that is, an area of the decoded block B is 64 pixels. The decoder side determines that the decoded block B satisfies the classification condition of the class 0, adds the displacement vector of the decoded block B to the list corresponding to the class 0, and sets the sequence number of the displacement vector of the decoded block B in the list corresponding to the class 0 as 1.

Using the class 1 as an example, after a displacement vector and auxiliary information of a decoded block C enter the historical motion information list, the decoder side determines a quantity of use times of the displacement vector of the decoded block C from the auxiliary information of the decoded block C, for example, 1. The decoder side determines that the decoded block C does not satisfy the classification condition of the class 1, and does not classify the decoded block C into the class 1. After a displacement vector of a decoded block D enters the historical motion information list, the decoder side determines a quantity of use times of the displacement vector of the decoded block D from the auxiliary information of the decoded block D, for example, 3. The decoder side determines that the decoded block D satisfies the classification condition of the class 1, adds the decoded block D to the list corresponding to the class 1, and sets the sequence number of the displacement vector of the decoded block D in the list corresponding to the class 1 as 1.

Figure 8:
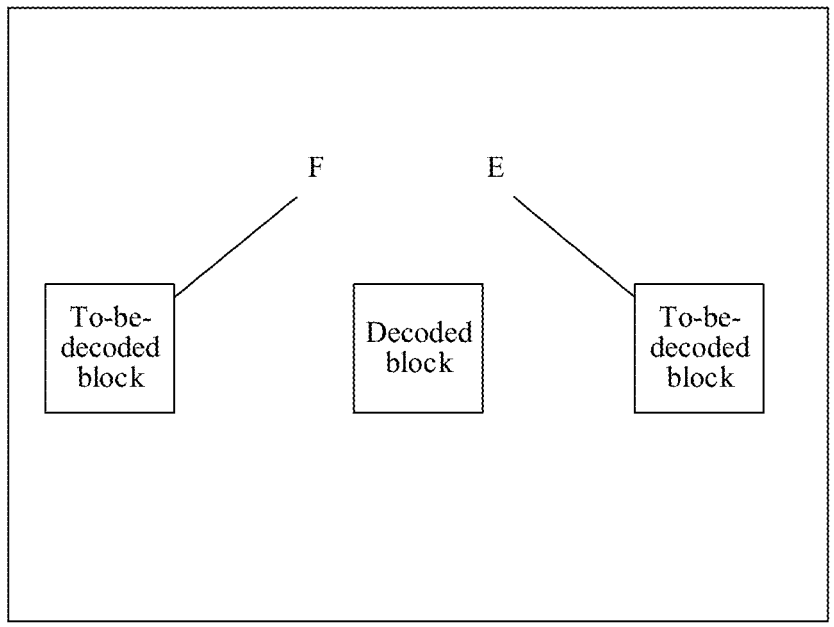
FIG. 8 is a schematic diagram of relative positions of a to-be-decoded block and a decoded block according to some embodiments.

Using the class 2 as an example, when a displacement vector and auxiliary information of a decoded block E enter the historical motion information list, the decoder side determines coordinates of the upper left corner of the decoded block E from the auxiliary information of the decoded block E, such as (1, 2). If the coordinates of the upper left corner of the to-be-decoded block are (0, 2), referring to FIG. 8, because the coordinates of the upper left corner of the decoded block E are located to the right of the coordinates of the upper left corner of the to-be-decoded block, the decoder side determines that the decoded block E does not satisfy the classification condition of the class 2, and does not classify the decoded block E into the class 2. When a displacement vector of a decoded block F enters the historical motion information list, the decoder side determines coordinates of the upper left corner of the decoded block F from auxiliary information of the decoded block F, such as (3, 2). If the coordinates of the upper left corner of the to-be-decoded block are (2, 2), referring to FIG. 8, because the coordinates of the upper left corner of the decoded block F are located to the left of the coordinates of the upper left corner of the to-be-decoded block, the decoder side determines that the decoded block F satisfies the classification condition of the class 2, adds the decoded block F to the list corresponding to the class 2, and sets a sequence number of the displacement vector of the decoded block F to 1 in the list corresponding to the class 2.

Classification methods of class 3 to class 6 belong to the same inventive concept as the class 2, and are not repeated herein.

In an example embodiment, during classification, if the decoded block satisfies the classification condition of any class of the plurality of classes, and a displacement vector is included in the class, the decoder side does not classify the displacement vector corresponding to the decoded block into the class.

The decoder side can ensure that there is at most one displacement vector under each class. In this way, storage space occupied by the list corresponding to the class can be reduced, and in addition, there is no need to perform duplication checking before generating the candidate displacement vector list subsequently, which improves the efficiency of video decoding.

For example, when a displacement vector and auxiliary information of a decoded block G enter the historical motion information list, the decoder side can perform classification on the decoded block G according to the auxiliary information of the decoded block G. If the auxiliary information of the decoded block G satisfies the classification condition of the class 3, the decoder side queries the list corresponding to the class 3. If the displacement vector is not included in the list corresponding to the class 3, the decoder side adds the displacement vector of the decoded block G to the list corresponding to the class 3. If a displacement vector is included in the list corresponding to the class 3, the decoder side compares the auxiliary information of the decoded block G with the classification condition of the class 4, and so on, to ensure that there is at most one displacement vector in one class.

In an example embodiment, in a case that the decoded block satisfies the classification condition of any class of the plurality of classes, the decoder side adds an index of the displacement vector of the decoded block in the historical motion information list to the class.

The index is an order of a displacement vector in the historical motion information list, and certainly can also be another unique index that can find the displacement vector in the historical motion information list, which is not limited thereto.

The decoder side adds the index rather than the displacement vector to the class. In this way, the storage space occupied by the list corresponding to the class can be reduced.

702. A decoder side stops performing classification on the displacement vector of the decoded block.

Through operation 701 and operation 702, for the displacement vector of any decoded block, the decoder side can stop performing classification on the displacement vector after adding the displacement vector to the class. Therefore, it is ensured that one displacement vector is only classified into one class, the operation of duplication checking when the candidate vector list is subsequently exported is avoided, the decoding complexity is reduced, and the decoding efficiency is improved.

703. The decoder side generates a candidate displacement vector list according to the classified displacement vector.

In some embodiments, the candidate displacement vector list includes a plurality of candidate displacement vectors, and the plurality of candidate displacement vectors are in one-to-one correspondence with the plurality of classes. In other words, the candidate displacement vector list is generated by the decoder side sequentially obtaining candidate displacement vectors from the plurality of classes.

In an example embodiment, the decoder side generates a candidate displacement vector list according to the classified displacement vector, which can be implemented in any of the following manners:

Manner 1. The decoder side generates, in response to a class that does not include the displacement vector being included in the plurality of classes, a candidate displacement vector list according to the displacement vector included in another class, where the another class is a class other than the class in the plurality of classes. That is, the decoder side adds, in response to a class that does not include the displacement vector being included in the plurality of classes, a displacement vector included in another class to the candidate displacement vector list, where the another class is a class other than the class in the plurality of classes.

For example, the decoder side sequentially obtains the displacement vectors from the list corresponding to each class according to sequence numbers of the plurality of classes. If there are six classes, the decoder side sequentially obtains a displacement vector from the list corresponding to the six classes, adds the obtained displacement vector to the candidate displacement vector list, and the obtained displacement vector is also the candidate displacement vector. In response to no displacement vector being stored in the list corresponding to any class of the plurality of classes, the decoder side skips the class, that is, a position corresponding to the class in the candidate displacement vector list is empty.

Manner 2. The decoder side adds, in response to the class that does not include the displacement vector being included in the plurality of classes, a first displacement vector to the candidate displacement vector list.

In some embodiments, the first displacement vector is a displacement vector designed by a person skilled in the art, such as a zero vector (0, 0), or a vector related to a size, such as (−w, 0) and (0, −h), where w and h are respectively a width and a height of a minimum decoding unit, or a width and a height of the to-be-decoded block, or a preset width and height, which is not limited thereto.

Based on the manner 2, in response to a class that does not include the displacement vector being included in the plurality of classes, the decoder side generates a first displacement vector list according to the plurality of first displacement vectors. The decoder side determines the first displacement vector corresponding to the class from the first displacement vector list, and adds the first displacement vector corresponding to the class to the candidate displacement vector list.

For example, the decoder side creates a first displacement vector list including nine first displacement vectors such as (0, 0), (−w, 0), (−2*w, 0), (0, −h), (0, −2*h), (−w, −h), (−w, −2*h), (−2*w, −h), and (−2*w, −2*h). The decoder side numbers each first displacement vector in the first displacement vector list, for example, in a left-to-right order, or in a right-to-left order. If the decoder side numbers each first displacement vector in the first displacement vector list in a left-to-right order, then the nine first displacement vectors such as (0, 0), (−w, 0), (−2*w, 0), (0, −h), (0, −2*h), (−w, −h), (−w, −2*h), (−2*w, −h), and (−2*w, −2*h) respectively correspond to sequence number 0 to sequence number 8. If the decoder side numbers each first displacement vector in the first displacement vector list in a right-to-left order, then the nine first displacement vectors such as (0, 0), (−w, 0), (−2*w, 0), (0, −h), (0, −2*h), (−w, −h), (−w, −2*h), (−2*w, −h), and (−2*w, −2*h) respectively correspond to sequence number 8 to sequence number 0. A numbering manner of the decoder side is not limited herein. In response to a class that does not include a displacement vector in the plurality of classes, for example, a class with a sequence number 4 that does not include the displacement vector, the decoder side adds the first displacement vector with the sequence number 4 to the candidate displacement vector list from the first displacement vector list as the displacement vector corresponding to the class with the sequence number 4.

In addition to adding the displacement vector to the candidate displacement vector list according to the manners in the foregoing examples, the decoder side can also determine the first displacement vector from the first displacement vector list in other possible manners, and add the first displacement vector to the candidate displacement vector list. For example, the decoder side can randomly determine the first displacement vector from the first displacement vector list, and add the first displacement vector to the candidate displacement vector list.

Manner 3. The decoder side adds, in response to the class that does not include the displacement vector being included in the plurality of classes, a second displacement vector to the candidate displacement vector list, where the second displacement vector is a second displacement vector of a decoded block that is adjacent to a position of a to-be-decoded block.

Figure 9:
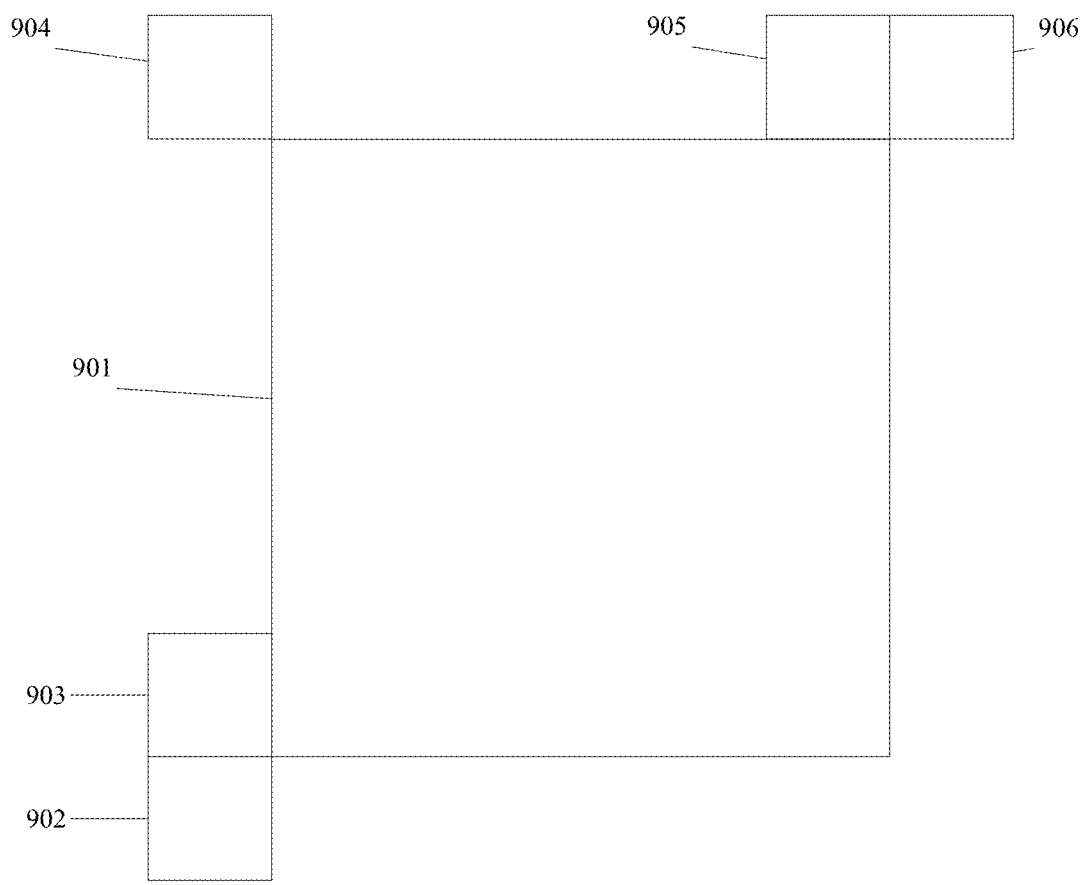
FIG. 9 is a schematic diagram of relative positions of a to-be-decoded block and a decoded block according to some embodiments.

For example, referring to FIG. 9, 901 is a to-be-decoded block, and decoded blocks 902 to 906 are decoded blocks that are adjacent to a position of the to-be-decoded block. In response to a class that does not include a displacement vector being included in the plurality of classes, for example, the class 3 that does not include the displacement vector, the decoder side adds the second displacement vector of any the decoded block in the decoded blocks 902 to 906 to the candidate displacement vector list, for example, adds the second displacement vector of the decoded block 905 to the candidate displacement vector list as the displacement vector corresponding to the class 3.

The decoded blocks that are adjacent to the position of the to-be-decoded block shown in FIG. 9 are only arranged for the ease of understanding. As the decoding standard is updated, the quantity and position of the decoded blocks that are adjacent to the position of the to-be-decoded block may be updated accordingly, which is not limited thereto.

In some embodiments, the decoder side adds, in response to the decoded block that is adjacent to the position of the to-be-decoded block being not corresponding to any the displacement vector, a fourth displacement vector to the candidate displacement vector list.

For example, if the decoded block that is adjacent to the position of the to-be-decoded block does not include a motion vector, for example, the decoded block being a non-IBC/ISC decoded block, or an isolated point in an ISC decoded block, the decoder side adds a fourth displacement vector to the candidate displacement vector list, where the fourth displacement vector is a preset displacement vector. In some embodiments, the preset vector includes the first displacement vector in the manner 1 or the manner 2, and certainly may also include a zero vector (0, 0), where for the method for determining the first displacement vector, reference may be made to the previous description, which is not repeated herein.

Based on the manner 3, the decoder side generates, in response to the class that does not include the displacement vector being included in the plurality of classes, a second displacement vector list according to a plurality of second displacement vectors, where the plurality of second displacement vectors are displacement vectors of a plurality of decoded blocks that are adjacent to the position of the to-be-decoded block. The decoder side determines a second displacement vector corresponding to the class from the second displacement vector list, and adds the second displacement vector corresponding to the class to the candidate displacement vector list.

For example, the decoder side generates a second displacement vector list according to the second displacement vectors of the decoded blocks 902 to 906 as shown in FIG. 9. The decoder side numbers the second displacement vectors in the second displacement vector list in a left-to-right order or in a right-to-left order. In response to a class that does not include a displacement vector being included in the plurality of classes, for example, a class 2 that does not include the displacement vector, the decoder side obtains the second displacement vector with the sequence number 2 from the second displacement vector list, and adds the second displacement vector with the sequence number 2 to the candidate displacement vector list.

In addition, the decoder side can also obtain the second displacement vector from the second displacement vector list in other manners. For example, the decoder side first adds the second displacement vector added to the second displacement vector list to the candidate displacement vector list, or last adds the second displacement vector added to the second displacement vector list to the candidate displacement vector list, which is not limited thereto.

In addition, when generating the second displacement vector list, the decoder side can perform duplication checking on the second displacement vectors of the plurality of decoded blocks that are adjacent to the position of the to-be-decoded block. In response to the second displacement vectors of the plurality of decoded blocks including the same second displacement vector, the decoder side deletes the same second displacement vector, and generates a second displacement vector list based on the different second displacement vectors.

In addition, in response to the decoder side not finding the second displacement vector corresponding to the class in the second displacement vector list, the decoder side adds a preset displacement vector to the candidate displacement vector list. In some embodiments, the preset vector includes the first displacement vector in the manner 1 or the manner 2, and certainly may also include a zero vector (0, 0), where for the method for determining the first displacement vector, reference may be made to the previous description, which is not repeated herein.

Manner 4. The decoder side adds, in response to the class that does not include the displacement vector being included in the plurality of classes, a third displacement vector to the candidate displacement vector list, where the third displacement vector is a displacement vector of the decoded block that is not adjacent to a position of a to-be-decoded block.

For example, the decoder side respectively obtains the third displacement vector of any the decoded block in the decoded blocks with coordinates of an upper left corner such as (x−8, y+h/2), (x+2/2, y−8), and (x−8, y−8). The third displacement vector is added to the candidate displacement vector list as the displacement vector corresponding to the class that does not include the displacement vector, where x and y are respectively a horizontal coordinate and a vertical coordinate of the upper left corner of the to-be-decoded block, and h is a height of the to-be-decoded block.

Certainly, the coordinates of the decoded blocks that are not adjacent to the position of the to-be-decoded block are only set for the ease of understanding and a person skilled in the art can also perform setting according to actual conditions, which is not limited thereto.

Based on the manner 4, the decoder side generates, in response to the class that does not include the displacement vector being included in the plurality of classes, a third displacement vector list according to a plurality of third displacement vectors, where the plurality of third displacement vectors are displacement vectors of a plurality of decoded blocks that are not adjacent to the position of the to-be-decoded block. The decoder side determines a third displacement vector corresponding to the class from the third displacement vector list, and adds the third displacement vector corresponding to the class to the candidate displacement vector list.

For example, the decoder side generates a third displacement vector list according to the plurality of third displacement vectors. The decoder side numbers the third displacement vectors in the third displacement vector list in a left-to-right order or in a right-to-left order. In response to a class that does not include a displacement vector being included in the plurality of classes, for example, a class 2 that does not include the displacement vector, the decoder side obtains the third displacement vector with the sequence number 2 from the third displacement vector list, and adds the third displacement vector with the sequence number 2 to the candidate displacement vector list.

In addition, the decoder side can also obtain the third displacement vector from the third displacement vector list in other manners. For example, the decoder side first adds the third displacement vector added to the third displacement vector list to the candidate displacement vector list, or last adds the third displacement vector added to the third displacement vector list to the candidate displacement vector list, which is not limited thereto.

In addition, when generating the third displacement vector list, the decoder side can perform duplication checking on the third displacement vectors of the plurality of decoded blocks that are not adjacent to the position of the to-be-decoded block. In response to the third displacement vectors of the plurality of decoded blocks including the same third displacement vector, the decoder side deletes the same third displacement vector, and generates a third displacement vector list based on the different third displacement vectors.

In addition, in response to the decoder side not finding the third displacement vector corresponding to the class in the third displacement vector list, the decoder side adds a preset displacement vector to the candidate displacement vector list. In some embodiments, the preset vector includes the first displacement vector in the manner 1 or the manner 2, and certainly may also include a zero vector (0, 0), where for the method for determining the first displacement vector, reference may be made to the previous description, which is not repeated herein.

Manner 5. The decoder side adds, in response to the class that does not include the displacement vector being included in the plurality of classes, a displacement vector of a decoded block whose decoding order is adjacent to the to-be-decoded block in the historical motion information list to the candidate displacement vector list.

In some embodiments, the decoder side adds, in response to the class that does not include the displacement vector being included in the plurality of classes, a displacement vector of a previous decoded block before the to-be-decoded block to the candidate displacement vector list, that is, adds the displacement vector of the decoded block whose decoding time is closest to the to-be-decoded block to the candidate displacement vector list.

For example, the decoder side obtains the displacement vector that is last added to the historical motion information list from the historical motion information list, and adds the displacement vector to the candidate displacement vector list.

Manner 6. The decoder side adds, in response to the class that does not include the displacement vector being included in the plurality of classes, a displacement vector of a target position in the historical motion information list to the candidate displacement vector list.

In some embodiments, a displacement vector of a target position is a displacement vector whose sequence number is the same as a sequence number of the class in the historical motion information list.

In the manner, two different displacement vectors may be determined in the same historical motion information list. For example, there are six displacement vectors such as (−1, −2), (−2, −3), (−1, −3), (−2, −4), (−1, −1), and (0, −1) stored in the historical motion information list, where (−1, −2) is the displacement vector first added to the historical motion information list, and (0, −1) is the displacement vector last added to the historical motion information list. If the sequence number of the class is 3, and the decoder side sorts the displacement vectors in the historical motion information list in the left-to-right order, then the decoder side adds the displacement vector (−1, −3) to the candidate displacement vector list. If the decoder side sorts the displacement vectors in the historical motion information list in the right-to-left order, then the decoder side can add the displacement vector (−1, −1) to the candidate displacement vector list.

In addition, if the displacement vector corresponding to the class is not included at the target position in the historical motion information list, the decoder side adds a preset displacement vector to the candidate displacement vector list. In some embodiments, the preset vector includes the first displacement vector in the manner 1 or the manner 2, and certainly may also include a zero vector (0, 0), where for the method for determining the first displacement vector, reference may be made to the previous description, which is not repeated herein.

For example, if a length of the historical motion information list is six, but there are seven classes in response to the displacement vector being not included in a class 7. Because the length of the historical motion information list is less than a sequence number of the class 7, the decoder side cannot query the displacement vector corresponding to the class 7 in the motion information list, and the decoder side adds a preset displacement vector to the candidate displacement vector list.

The manner 1 to manner 6 can be used independently or simultaneously, which is not limited thereto.

704. The decoder side determines, according to an index of a to-be-decoded block, a target displacement vector corresponding to the to-be-decoded block in the candidate displacement vector list.

Using the index of the to-be-decoded block as an order identifier of the target displacement vector corresponding to the to-be-decoded block in the candidate displacement vector list as an example, the decoder side can obtain the target displacement vector from the candidate displacement vector list according to the order identifier in a decoding process.

705. The decoder side decodes the to-be-decoded block according to the target displacement vector.

In the technical solutions provided in some embodiments, in a process of performing classification on the displacement vector of the decoded block in the historical motion information list on the decoder side, once the displacement vector of the decoded block is added to a class, the decoder side does not continue performing classification on the displacement vector of the decoded block, but stops performing classification on the displacement vector of the decoded block. In this way, a situation in which a displacement vector is classified into a plurality of classes can be avoided, so that an operation of duplication checking is not required when constructing a candidate displacement vector list, the complexity of video decoding is reduced, and the efficiency of video decoding is improved.

The video encoding method and the video decoding belong to the same inventive concept. For the same image block in the same image frame, the image block is referred to as the to-be-encoded block or the encoded block in the video encoding process, and is referred to as the to-be-decoded block or the decoded block in the video decoding process.

Figure 10:
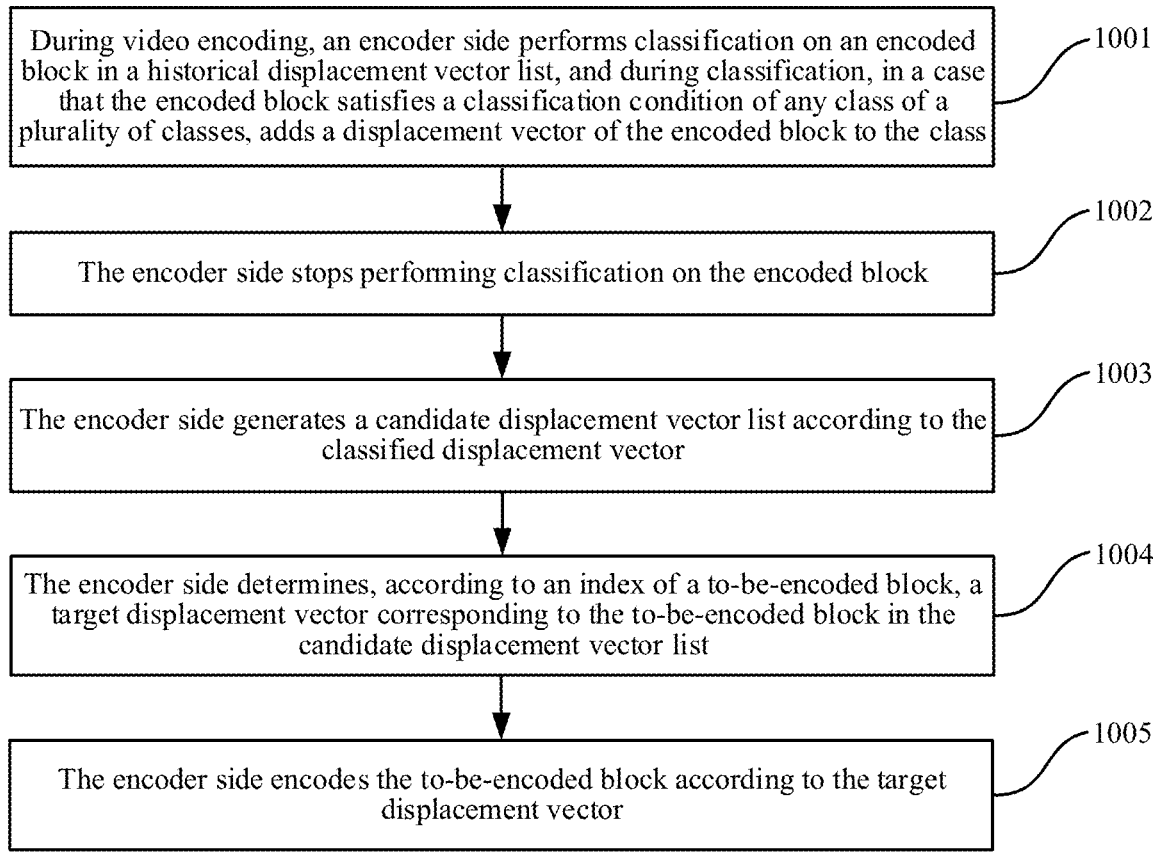
FIG. 10 is a flowchart of a video encoding method according to some embodiments.

FIG. 10 is a flowchart of a video encoding method according to some embodiments, the method includes the following operations.

1001. An encoder side performs classification on a displacement vector of an encoded block in a historical motion information list according to the following classification method, where the classification method includes: in a case that the encoded block satisfies a classification condition of any class of a plurality of classes, adding the displacement vector of the encoded block to the class.

In some embodiments, the classification condition includes at least one of the following:

a size of the decoded block is greater than or equal to a size threshold, a quantity of use times of the displacement vector of the decoded block is greater than a times threshold, and a spatial positional relationship between the decoded block and a to-be-decoded block satisfies a position condition.

Operation 1001 and operation 701 belong to the same inventive concept, and for the implementation method, reference may be made to the description of operation 701, which is not repeated herein.

In some embodiments, during classification, if the encoded block satisfies the classification condition of any one of the plurality of classes, and there is a displacement vector in the class, the encoder side does not classify the displacement vector of the encoded block into the class.

In some embodiments, in a case that the encoded block satisfies the classification condition of any one of the plurality of classes, the encoder side adds an index of the displacement vector of the encoded block in the historical motion information list to the class.

1002. An encoder side stops performing classification on the displacement vector of the encoded block.

Operation 1002 and operation 702 belong to the same inventive concept, and for the implementation method, reference may be made to the description of operation 702, which is not repeated herein.

1003. The encoder side generates a candidate displacement vector list according to the classified displacement vector.

Operation 1003 and operation 703 belong to the same inventive concept, and for the implementation method, reference may be made to the description of operation 703, which is not repeated herein.

The encoder side generates a candidate displacement vector list according to the classified displacement vector, which can be implemented in any of the following manners:

Manner 1. The encoder side generates, in response to a class that does not include the displacement vector in the plurality of classes, a candidate displacement vector list according to the displacement vector included in another class in the plurality of classes other than the class. That is, the encoder side adds, in response to a class that does not include the displacement vector in the plurality of classes, a displacement vector included in another class to the candidate displacement vector list, where the another class is a class other than the class in the plurality of classes.

Manner 2. The encoder side adds, in response to the class that does not include the displacement vector in the plurality of classes, a first displacement vector to the candidate displacement vector list.

In some embodiments, in response to a class that does not include the displacement vector in the plurality of classes, the encoder side generates a first displacement vector list according to the plurality of first displacement vectors. The encoder side determines the first displacement vector corresponding to the class from the first displacement vector list, and adds the first displacement vector corresponding to the class to the candidate displacement vector list.

Manner 3. The encoder side adds, in response to the class that does not include the displacement vector in the plurality of classes, a second displacement vector to the candidate displacement vector list, where the second displacement vector is a displacement vector of the encoded block that is adjacent to a position of a to-be-encoded block.

In some embodiments, the encoder side adds, in response to the encoded block that is adjacent to the position of the to-be-encoded block not corresponding to any one of the displacement vectors, a fourth displacement vector to the candidate displacement vector list.

In embodiments, the encoder side generates, in response to the class that does not include the displacement vector being included in the plurality of classes, a second displacement vector list according to the plurality of second displacement vectors. The encoder side determines a second displacement vector corresponding to the class from the second displacement vector list, and adds the second displacement vector corresponding to the class to the candidate displacement vector list.

Manner 4. The encoder side adds, in response to the class that does not include the displacement vector in the plurality of classes, a third displacement vector to the candidate displacement vector list, where the third displacement vector is a displacement vector of the encoded block that is not adjacent to a position of a to-be-encoded block.

Manner 5. The encoder side adds, in response to the class that does not include the displacement vector in the plurality of classes, a displacement vector of the encoded block whose encoding time is adjacent to the to-be-encoded block to the candidate displacement vector list.

Manner 6. The encoder side adds, in response to the class that does not include the displacement vector in the plurality of classes, a displacement vector of a target position in the historical motion information list to the candidate displacement vector list.

1004. The encoder side determines a target displacement vector corresponding to a to-be-encoded block in the candidate displacement vector list.

In some embodiments, the target displacement vector is a displacement vector whose rate-distortion parameter conforms to a target condition.

In some embodiments, the encoder side determines rate-distortion parameters of a plurality of displacement vectors in the candidate displacement vector list, and determines the displacement vector with the smallest rate-distortion parameter as the target displacement vector corresponding to the to-be-encoded block.

For example, if the bit rate of video encoding is 1000 kbps, the encoder side can determine the rate-distortion parameters corresponding to the displacement vectors respectively in the candidate displacement vector list under the bit rate of 1000 kbps. For a relationship between the video bit rate and the image distortion rate obtained by using the same video encoding method, reference may be made to formula (1). The encoder side generates the Lagrangian cost function (2) based on the formula (1), and the encoder side determines the rate-distortion parameters corresponding to a plurality of division modes through the Lagrangian cost function (2), so as to determine a target displacement vector with the smallest rate-distortion parameter.

$$R(D) = \alpha \ln\left(\frac{\delta^2}{D}\right), \quad (1)$$

where

R is the bit rate, D is the image distortion rate, α is the coefficient, and δ2 is a variance of a plurality of pixels in a to-be-encoded unit.

$$\text{Min}\{J = D + \lambda R\} \quad (2), \text{ where}$$

Min{ } is a minimum value, λ is the coefficient, and J is the rate-distortion parameter.

1005. The encoder side encodes the to-be-encoded block according to the target displacement vector, and generates, according to an order of the target displacement vector in the candidate displacement vector list, an index of the to-be-encoded block.

In some embodiments, the index of the target displacement vector is an order identifier of the target displacement vector of the target displacement vector in the candidate displacement vector list. For example, there are six displacement vectors in the candidate displacement vector list. An order of the target displacement vector in the candidate displacement vector list is 2, and then the encoder side can use 2 as an index of the target displacement vector. In the subsequent decoding process, the decoder side can directly obtain the target displacement vector from the candidate displacement vector list through the index 2.

In the technical solutions provided in some embodiments, in a process of performing classification on the displacement vector in the historical motion information list on the encoder side, once the displacement vector of the encoded block is added to a class, the encoder side does not continue performing classification on the displacement vector of the encoded block, but stops performing classification on the displacement vector of the encoded block. In this way, a situation in which a displacement vector is classified into a plurality of classes can be avoided, so that an operation of duplication checking is not required when constructing a candidate displacement vector list, the complexity of video encoding is reduced, and the efficiency of video encoding is improved.

Figure 11:
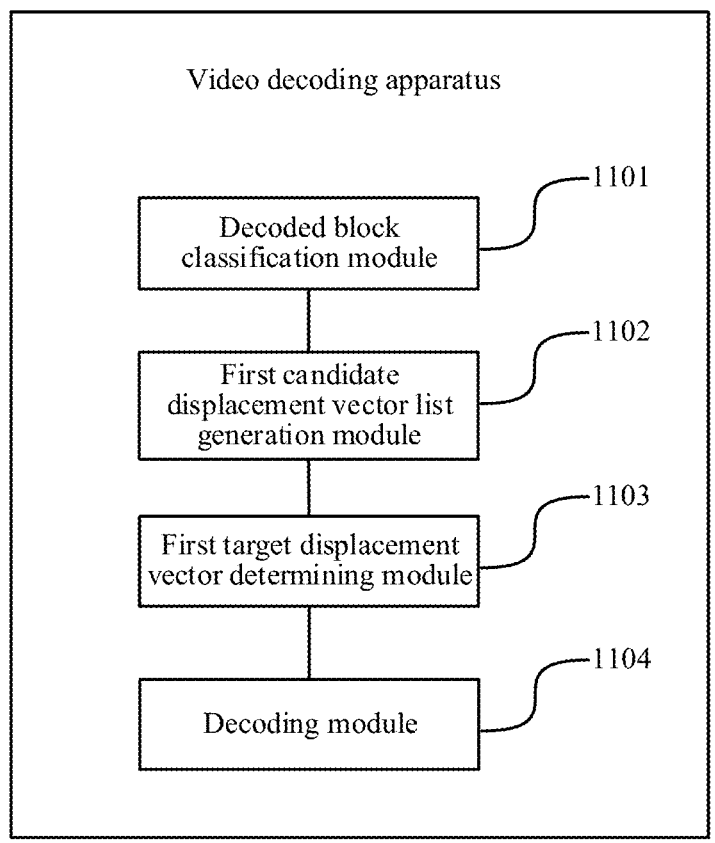
FIG. 11 is a schematic structural diagram of a video decoding apparatus according to some embodiments.

FIG. 11 is a schematic structural diagram of a video decoding apparatus according to some embodiments, the apparatus includes: a decoded block classification module 1101, a first candidate displacement vector list generation module 1102, a first target displacement vector determining module 1103, and a decoding module 1104.

A decoded block classification module 1101 is configured to perform classification on a displacement vector of a decoded block in a historical motion information list according to a following classification method. The classification method includes: in a case that the decoded block satisfies a classification condition of any class of a plurality of classes, adding the displacement vector of the decoded block to the class, and stopping performing classification on the displacement vector of the decoded block.

The decoded block classification module 1101 may be further configured to skip adding the displacement vector of the decoded block into the class during classification if the decoded block satisfies the classification condition of any class of the plurality of classes, and a displacement vector is included in the class.

The decoded block classification module 1101 may be further configured to add, in a case that the decoded block satisfies the classification condition of any class of the plurality of classes, an index of the displacement vector of the decoded block in the historical motion information list to the class.

In some embodiments, the apparatus may further include:
the first candidate displacement vector list generation module 1102, configured to generate a candidate displacement vector list according to the classified displacement vector.

The first candidate displacement vector list generation module 1102, may be configured to perform any one of the following:
adding, in response to a class that does not include the displacement vector being included in the plurality of classes, a displacement vector included in another class to the candidate displacement vector list, where the another class is a class other than the class in the plurality of classes;
adding, in response to a class that does not include a displacement vector being included in the plurality of classes, a first displacement vector to the candidate displacement vector list;
adding, in response to a class that does not include a displacement vector being included in the plurality of classes, a second displacement vector to the candidate displacement vector list, where the second displacement vector is a displacement vector of a decoded block that is adjacent to a position of a to-be-decoded block;
adding, in response to a class that does not include a displacement vector being included in the plurality of classes, a third displacement vector to the candidate displacement vector list, where the third displacement vector is a displacement vector of a decoded block that is not adjacent to the position of the to-be-decoded block;
adding, in response to the class that does not include the displacement vector in the plurality of classes, a displacement vector of the decoded block whose decoding order is adjacent to the to-be-decoded block in the historical motion information list to the candidate displacement vector list; and
adding, in response to a class that does not include a displacement vector being included in the plurality of classes, a displacement vector of a target position in the historical motion information list to the candidate displacement vector list.

In some embodiments, the first candidate displacement vector list generation module 1102 may be configured to generate, in response to a class that does not include the displacement vector being included in the plurality of classes, a first displacement vector list according to the plurality of first displacement vectors, determine the first displacement vector corresponding to the class from the first displacement vector list, and add the first displacement vector corresponding to the class to the candidate displacement vector list.

The first candidate displacement vector list generation module 1102 may be configured to generate, in response to the class that does not include the displacement vector being included in the plurality of classes, a second displacement vector list according to the plurality of second displacement vectors; and determine a second displacement vector corresponding to the class from the second displacement vector list, and add the second displacement vector corresponding to the class to the candidate displacement vector list.

The first candidate displacement vector list generation module 1102 may be further configured to add, in response to the decoded block that is adjacent to the position of the to-be-decoded block being not corresponding to any the displacement vector, a fourth displacement vector to the candidate displacement vector list, where the fourth displacement vector is a preset displacement vector.

In a some embodiments, the apparatus may further include:
the first target displacement vector determining module 1103, configured to determine, according to an index of a to-be-decoded block, a target displacement vector corresponding to the to-be-decoded block in the candidate displacement vector list; and
the decoding module 1104, configured to decode the to-be-decoded block according to the target displacement vector.

In some embodiments, the classification condition may include at least one of the following:
a size of the decoded block is greater than or equal to a size threshold, a quantity of use times of the displacement vector of the decoded block is greater than a times threshold, and a spatial positional relationship between the decoded block and a to-be-decoded block satisfies a position condition.

In the technical solutions provided in some embodiments, in a process of performing classification on the displacement vector of the decoded block in the historical motion information list on the decoder side, once the displacement vector of the decoded block is added to a class, the decoder side does not continue performing classification on the displacement vector of the decoded block, but stops performing classification on the displacement vector of the decoded block. In this way, a situation in which a displacement vector is classified into a plurality of classes can be avoided, so that an operation of duplication checking is not required when constructing a candidate displacement vector list, the complexity of video decoding is reduced, and the efficiency of video decoding is improved.

Figure 12:
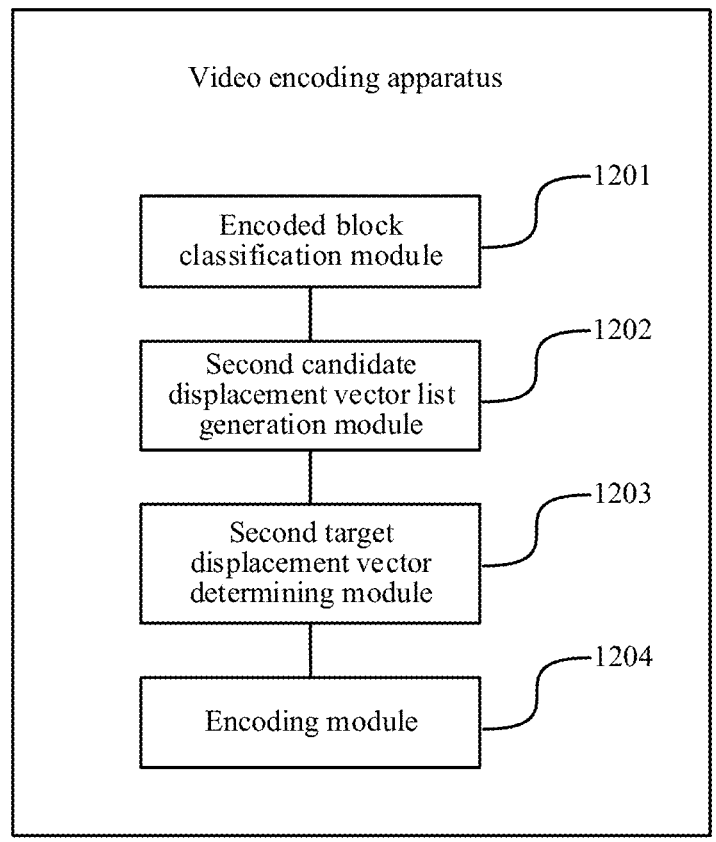
FIG. 12 is a schematic structural diagram of a video encoding apparatus according to some embodiments.

FIG. 12 is a schematic structural diagram of a video encoding apparatus according to some embodiments, the apparatus includes: an encoded block classification module 1201, a second candidate displacement vector list generation module 1202, a second target displacement vector determining module 1203, and an encoding module 1204.

The encoded block classification module 1201 is configured to perform classification on a displacement vector of an encoded block in a historical motion information list according to a following classification method. The classification method includes: in a case that the encoded block satisfies a classification condition of any class of a plurality of classes, adding the displacement vector of the encoded block to the class, and stopping performing classification on the displacement vector of the encoded block.

In some embodiments, the encoded block classification module 1201 may be further configured to skip adding the displacement vector corresponding to the encoded block into the class during classification in a case that the encoded block satisfies the classification condition of any class of the plurality of classes, and a displacement vector is included in the class.

The encoded block classification module 1201 may be configured to add, in a case that the encoded block satisfies the classification condition of any class of the plurality of classes, an index of the displacement vector of the encoded block in the historical motion information list to the class.

In some embodiments, the apparatus may further include:
the second candidate displacement vector list generation module 1202, configured to generate a candidate displacement vector list according to the classified displacement vector;
the second target displacement vector determining module 1203, configured to determine, a target displacement vector corresponding to the to-be-encoded block in the candidate displacement vector list; and
the encoding module 1204, configured to encode the to-be-encoded block according to the target displacement vector, and generate an index of the to-be-encoded block according to an order of the target displacement vector in the candidate displacement vector list.

In some embodiments, the second candidate displacement vector list generation module 1202 may be configured to perform any one of the following:
adding, in response to a class that does not include the displacement vector being included in the plurality of classes, a displacement vector included in another class to the candidate displacement vector list, where the another class is a class other than the class in the plurality of classes;
adding, in response to a class that does not include a displacement vector being included in the plurality of classes, a first displacement vector to the class, and generating, according to displacement vectors in the plurality of classes, the candidate displacement vector list;
adding, in response to a class that does not include a displacement vector being included in the plurality of classes, a second displacement vector to the candidate displacement vector list, where the second displacement vector is a displacement vector of a decoded block that is adjacent to a position of a to-be-decoded block;
adding, in response to a class that does not include a displacement vector being included in the plurality of classes, a third displacement vector to the candidate displacement vector list, where the third displacement vector is a displacement vector of a decoded block that is not adjacent to the position of the to-be-decoded block;
adding, in response to a class that does not include a displacement vector being included in the plurality of classes, a displacement vector of an encoded block whose encoding order is adjacent to a to-be-encoded block in the historical motion information list to the candidate displacement vector list; and
adding, in response to a class that does not include a displacement vector being included in the plurality of classes, a displacement vector of a target position in the historical motion information list to the candidate displacement vector list.

The second candidate displacement vector list generation module 1202 may be configured to generate, in response to a class that does not include the displacement vector being included in the plurality of classes, a first displacement vector list according to the plurality of first displacement vectors, determine the first displacement vector corresponding to the class from the first displacement vector list, and add the first displacement vector corresponding to the class to the candidate displacement vector list.

The second candidate displacement vector list generation module 1202 may be configured to generate, in response to the class that does not include the displacement vector being included in the plurality of classes, a second displacement vector list according to the plurality of second displacement vectors; and determine a second displacement vector corresponding to the class from the second displacement vector list, and add the second displacement vector corresponding to the class to the candidate displacement vector list.

In some embodiments, the second candidate displacement vector list generation module 1202 may be further configured to add, in response to an encoded block that is adjacent to a position of the to-be-encoded block being not corresponding to any the displacement vector, a fourth displacement vector to the candidate displacement vector list, where the fourth displacement vector is a preset displacement vector.

The second target displacement vector determining module 1203 may be configured to determine rate-distortion parameters of a plurality of displacement vectors in the candidate displacement vector list; and determine a displacement vector with a smallest rate-distortion parameter as the target displacement vector corresponding to the to-be-encoded block.

In some embodiments, the classification condition may include at least one of the following:
a size of the decoded block is greater than or equal to a size threshold, a quantity of use times of the displacement vector of the decoded block is greater than a times threshold, and a spatial positional relationship between the decoded block and a to-be-decoded block satisfies a position condition.

In the technical solutions provided in some embodiments, in a process of performing classification on the displacement vector in the historical motion information list on the encoder side, once the displacement vector of the encoded block is added to a class, the encoder side does not continue performing classification on the displacement vector of the encoded block, but stops performing classification on the displacement vector of the encoded block. In this way, a situation in which a displacement vector is classified into a plurality of classes can be avoided, so that an operation of duplication checking is not required when constructing a candidate displacement vector list, the complexity of video encoding is reduced, and the efficiency of video encoding is improved.

Figure 13:
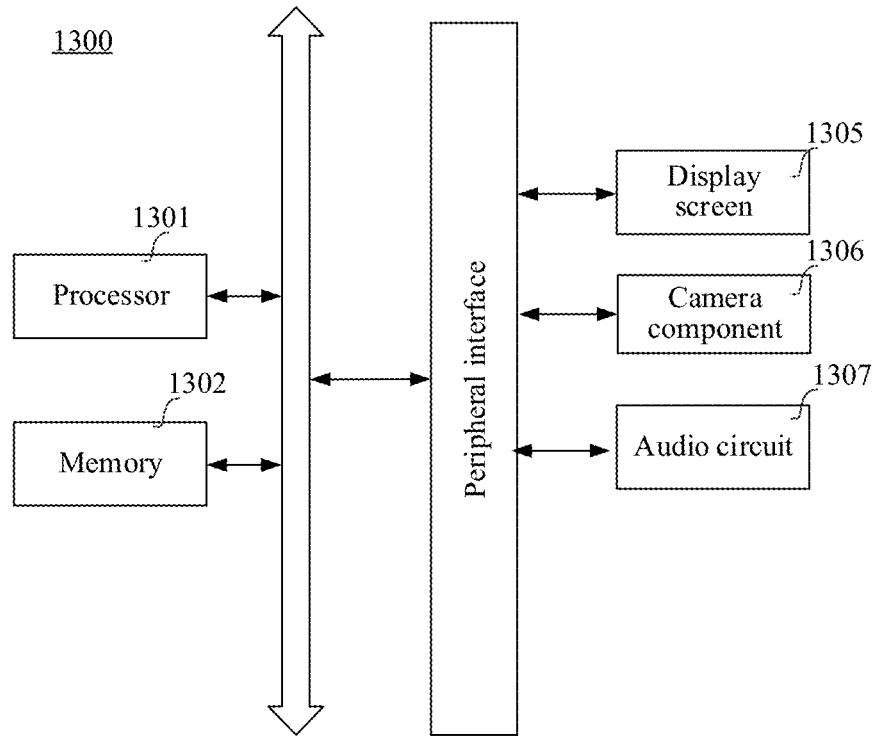
FIG. 13 is a schematic structural diagram of a terminal according to some embodiments.

Some embodiments provide a computer device for performing the method. The computer device can be implemented as a terminal or a server. The terminal includes an encoder side and a decoder side. A structure of the terminal is first introduced below:

FIG. 13 is a schematic structural diagram of a terminal according to some embodiments. The terminal 1300 may be a smartphone, a tablet computer, a notebook computer, or a desktop computer. The terminal 1300 may further be referred to as user equipment, a portable terminal, a laptop terminal, a desktop terminal, or by another name.

The terminal 1300 may include one or more processors 1301 or one or more memories 1302.

The processor 1301 may include one or more processing cores, for example, a 4-core processor or an 8-core processor. The processor 1301 may be implemented by using at least one hardware form of a digital signal processor (DSP), a field-programmable gate array (FPGA), and a programmable logic array (PLA). The processor 1301 may also include a main processor and a coprocessor. The main processor is a processor configured to process data in an awake state, and is also referred to as a central processing unit (CPU). The coprocessor is a low power consumption processor configured to process the data in a standby state. In some embodiments, the processor 1301 may be integrated with a graphics processing unit (GPU) that is responsible for rendering and drawing content needing to be displayed by a display screen. In some embodiments, the processor 1301 may further include an artificial intelligence (AI) processor. The AI processor is configured to process computing operations related to machine learning.

The memory 1302 may include one or more computer-readable storage media that may be non-transitory. The memory 1302 may further include a high-speed random access memory and a non-volatile memory, such as one or more magnetic disk storage devices or flash storage devices.

In some embodiments, the computer device 1300 may further include: a display screen 1303, a camera assembly 1304, and an audio circuit 1305.

The display screen 1303 is configured to display a user interface (UI). The UI may include a graph, a text, an icon, a video, and any combination thereof. When the display screen 1305 is the touch display screen, the display screen 1305 also has the capability to collect a touch signal on or above a surface of the display screen 1305. The touch signal may be inputted into the processor 1301 as a control signal for processing. In this case, the display screen 1305 may be further configured to provide a virtual button and/or a virtual keyboard, also referred to as a soft button and/or a soft keyboard.

The camera component 1304 is configured to capture an image or a video. In some embodiments, the camera assembly 1306 includes a front-facing camera and a rear-facing camera. Generally, the front-facing camera is disposed on the front panel of the terminal, and the rear-facing camera is disposed on a back surface of the terminal.

The audio circuit 1305 may include a microphone and a loudspeaker. The microphone is configured to acquire sound waves of a user and an environment, and convert the sound waves into electrical signals and input the electrical signals into the processor 1301 for processing, or input the electrical signals into the radio frequency circuit 1304 to implement voice communication.

A person skilled in the art may understand that the structure shown in FIG. 13 does not constitute a limitation to the terminal 1300, and the terminal may include more or fewer components than those shown in the figure, or some components may be combined, or a different component deployment may be used.

Figure 14:
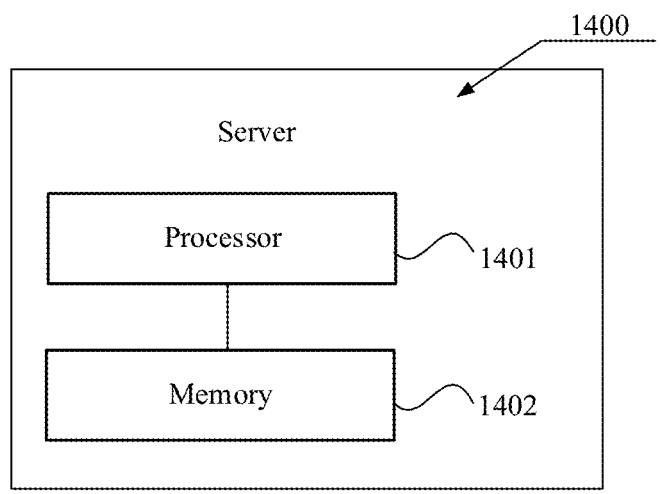
FIG. 14 is a schematic structural diagram of a server according to some embodiments.

The computer device can further be implemented as a server, and a structure of the server is introduced below:

FIG. 14 is a schematic structural diagram of a server according to some embodiments. The server 1400 may vary greatly because a configuration or performance varies, and may include one or more central processing units (CPU) 1401 and one or more memories 1402. The one or more memories 1402 store at least one computer program, and the at least one computer program is loaded and executed by the one or more processors 1401 to implement the methods provided in the foregoing various method embodiments. Certainly, the server 1400 may also have a wired or wireless network interface, a keyboard, an input/output interface and other components to facilitate input/output. The server 1400 may also include other components for implementing device functions. Details are not described herein.

The memory 1302 of the computer device stores at least one computer program, and the at least one computer program is loaded by the processor and performs the following operations:

performing classification on a displacement vector of a decoded block in a historical motion information list according to a following classification method.

The classification method includes: in a case that the decoded block satisfies a classification condition of any class of a plurality of classes, adding the displacement vector of the decoded block to the class, and stopping performing classification on the displacement vector of the decoded block.

In some embodiments, the processor is configured to add an index of the displacement vector of the decoded block in the historical motion information list to the class in a case that the decoded block satisfies the classification condition of any class of the plurality of classes.

In a possible implementation, the processor may be configured to generate a candidate displacement vector list according to the classified displacement vector.

In a possible implementation, the processor may be configured to perform any of the following operations:

adding, in response to a class that does not include the displacement vector being included in the plurality of classes, a displacement vector included in another class to the candidate displacement vector list, where the another class is a class other than the class in the plurality of classes;

adding, in response to a class that does not include a displacement vector being included in the plurality of classes, a first displacement vector to the candidate displacement vector list;

adding, in response to a class that does not include a displacement vector being included in the plurality of classes, a second displacement vector to the candidate displacement vector list, where the second displacement vector is a displacement vector of a decoded block that is adjacent to a position of a to-be-decoded block;

adding, in response to a class that does not include a displacement vector being included in the plurality of classes, a third displacement vector to the candidate displacement vector list, where the third displacement vector is a displacement vector of a decoded block that is not adjacent to the position of the to-be-decoded block;

adding, in response to a class that does not include a displacement vector being included in the plurality of classes, a displacement vector of a decoded block whose decoding order is adjacent to the to-be-decoded block in the historical motion information list to the candidate displacement vector list; and adding, in response to a class that does not include a displacement vector being included in the plurality of classes, a displacement vector of a target position in the historical motion information list to the candidate displacement vector list.

In some embodiments, the processor may be configured to perform the following operations:

generate, in response to the class that does not include the displacement vector being included in the plurality of classes, a first displacement vector list according to the plurality of first displacement vectors; and determine a first displacement vector corresponding to the class from the first displacement vector list, and adding the first displacement vector corresponding to the class to the candidate displacement vector list.

The processor may be configured to perform the following operations:

generate, in response to the class that does not include the displacement vector being included in the plurality of classes, a second displacement vector list according to the plurality of second displacement vectors; and determine a second displacement vector corresponding to the class from the second displacement vector list, and adding the second displacement vector corresponding to the class to the candidate displacement vector list.

In some embodiments, the processor may be configured to add, in response to the decoded block that is adjacent to the position of the to-be-decoded block being not corresponding to any displacement vector, a fourth displacement vector to the candidate displacement vector list, where the fourth displacement vector is a preset displacement vector.

The processor may be configured to perform the following operations:

determining, according to an index of a to-be-decoded block, a target displacement vector corresponding to the to-be-decoded block in the candidate displacement vector list; and decoding the to-be-decoded block according to the target displacement vector.

In some embodiments, the classification condition may include at least one of a size of the decoded block is greater than or equal to a size threshold, a quantity of use times of the displacement vector of the decoded block is greater than a times threshold, and a spatial positional relationship between the decoded block and a to-be-decoded block satisfies a position condition.

The processor may be configured to, in a case that the decoded block satisfies the classification condition of any class of the plurality of classes and a displacement vector is included in the class, skipping adding the displacement vector of the decoded block to the class.

The memory 1302 of the computer device stores at least one computer program, and the at least one computer program is loaded by the processor and performs the following operations:

performing classification on a displacement vector of an encoded block in a historical motion information list according to a following classification method, the classification method including: in a case that the encoded block satisfies a classification condition of any class of a plurality of classes, adding the displacement vector of the encoded block to the class, and stopping performing classification on the displacement vector of the encoded block.

In some embodiments, the processor may be configured to add an index of the displacement vector of the encoded block in the historical motion information list to the class in a case that the encoded block satisfies the classification condition of any class of the plurality of classes.

The processor may be configured to generate a candidate displacement vector list according to the classified displacement vector.

In some embodiments, the processor may be configured to perform any of the following operations:
  add, in response to a class that does not include a displacement vector being included in the plurality of classes, a displacement vector included in another class to the candidate displacement vector list, where the another class is a class other than the class in the plurality of classes;
  add, in response to a class that does not include a displacement vector being included in the plurality of classes, a first displacement vector to the class, and generating, according to displacement vectors in the plurality of classes, the candidate displacement vector list;
  add, in response to a class that does not include a displacement vector being included in the plurality of classes, a second displacement vector to the candidate displacement vector list, where the second displacement vector is a displacement vector of a decoded block that is adjacent to a position of a to-be-decoded block;
  add, in response to a class that does not include a displacement vector being included in the plurality of classes, a third displacement vector to the candidate displacement vector list, where the third displacement vector is a displacement vector of a decoded block that is not adjacent to the position of the to-be-decoded block;
  add, in response to a class that does not include a displacement vector being included in the plurality of classes, a displacement vector of an encoded block whose encoding order is adjacent to the to-be-encoded block in the historical motion information list to the candidate displacement vector list; and
  add, in response to a class that does not include a displacement vector being included in the plurality of classes, a displacement vector of a target position in the historical motion information list to the candidate displacement vector list.

The processor may be configured to perform the following operations:
  generate, in response to a class that does not include a displacement vector being included in the plurality of classes, a first displacement vector list according to a plurality of first displacement vectors; and
  determine a first displacement vector corresponding to the class from the first displacement vector list, and adding the first displacement vector corresponding to the class to the candidate displacement vector list.

The processor may be configured to perform the following operations:
  generate, in response to a class that does not include a displacement vector being included in the plurality of classes, a second displacement vector list according to a plurality of second displacement vectors; and
  determine a second displacement vector corresponding to the class from the second displacement vector list, and adding the second displacement vector corresponding to the class to the candidate displacement vector list.

The processor may be configured to add, in response to the encoded block that is adjacent to the position of the to-be-encoded block does not correspond to any displacement vector, a fourth displacement vector to the candidate displacement vector list, where the fourth displacement vector is a preset displacement vector.

In some embodiments, the processor is configured to perform the following operations:
  determine a target displacement vector corresponding to a to-be-encoded block in the candidate displacement vector list; and
  encode the to-be-encoded block according to the target displacement vector, and generating an index of the to-be-encoded block according to an order of the target displacement vector in the candidate displacement vector list.

The processor may be configured to perform the following operations:
  determining rate-distortion parameters of a plurality of displacement vectors in the candidate displacement vector list; and
  determining a displacement vector with a smallest rate-distortion parameter as the target displacement vector.

The processor may be configured, to in a case that the encoded block satisfies the classification condition of any class of the plurality of classes, and a displacement vector is included in the class, skip adding a displacement vector corresponding to the encoded block to the class.

Additionally, the classification condition may include at least one of a size of the decoded block is greater than or equal to a size threshold, a quantity of use times of the displacement vector of the decoded block is greater than a times threshold, and a spatial positional relationship between the decoded block and a to-be-decoded block satisfies a position condition.

In some embodiments, a computer-readable storage medium is further provided, such as a memory including a computer program. In some embodiments, the foregoing computer-readable storage medium may be a read-only memory (ROM), a random access memory (RAM), a compact disc ROM (CD-ROM), a magnetic tape, a floppy disk, an optical data storage device, or the like. The computer program can be executed by a processor to perform the following operations:
  performing classification on a displacement vector of a decoded block in a historical motion information list according to a following classification method.

The classification method includes: in a case that the decoded block satisfies a classification condition of any class of a plurality of classes, adding the displacement vector of the decoded block to the class, and stopping performing classification on the displacement vector of the decoded block.

The processor may be configured to add an index of the displacement vector of the decoded block in the historical motion information list to the class in a case that the decoded block satisfies the classification condition of any class of the plurality of classes.

The processor may be configured to generate a candidate displacement vector list according to the classified displacement vector.

In some embodiments, the processor may be configured to perform any of the following operations:
  add, in response to a class that does not include the displacement vector being included in the plurality of classes, a displacement vector included in another class to the candidate displacement vector list, where the another class is a class other than the class in the plurality of classes;
  add, in response to a class that does not include a displacement vector being included in the plurality of classes, a first displacement vector to the candidate displacement vector list;
  add, in response to a class that does not include a displacement vector being included in the plurality of classes, a second displacement vector to the candidate displacement vector list, where the second displacement vector is a displacement vector of a decoded block that is adjacent to a position of a to-be-decoded block;

add, in response to a class that does not include a displacement vector being included in the plurality of classes, a third displacement vector to the candidate displacement vector list, where the third displacement vector is a displacement vector of a decoded block that is not adjacent to the position of the to-be-decoded block;

add, in response to a class that does not include a displacement vector being included in the plurality of classes, a displacement vector of a decoded block whose decoding order is adjacent to the to-be-decoded block in the historical motion information list to the candidate displacement vector list; and add, in response to a class that does not include a displacement vector being included in the plurality of classes, a displacement vector of a target position in the historical motion information list to the candidate displacement vector list.

The processor may be configured to perform the following operations:

generate, in response to the class that does not include the displacement vector being included in the plurality of classes, a first displacement vector list according to the plurality of first displacement vectors; and determine a first displacement vector corresponding to the class from the first displacement vector list, and adding the first displacement vector corresponding to the class to the candidate displacement vector list.

In some embodiments, the processor may be configured to perform the following operations:

generate, in response to the class that does not include the displacement vector being included in the plurality of classes, a second displacement vector list according to the plurality of second displacement vectors; and determine a second displacement vector corresponding to the class from the second displacement vector list, and adding the second displacement vector corresponding to the class to the candidate displacement vector list.

The processor may be configured to add, in response to the decoded block that is adjacent to the position of the to-be-decoded block being not corresponding to any displacement vector, a fourth displacement vector to the candidate displacement vector list, where the fourth displacement vector is a preset displacement vector.

In some embodiments, the processor may be configured to perform the following operations:

determine, according to an index of a to-be-decoded block, a target displacement vector corresponding to the to-be-decoded block in the candidate displacement vector list; and decode the to-be-decoded block according to the target displacement vector.

The classification condition may include at least one of a size of the decoded block is greater than or equal to a size threshold, a quantity of use times of the displacement vector of the decoded block is greater than a times threshold, and a spatial positional relationship between the decoded block and a to-be-decoded block satisfies a position condition.

Additionally, the processor may be configured to, in a case that the decoded block satisfies the classification condition of any class of the plurality of classes and a displacement vector is included in the class, skipping adding the displacement vector of the decoded block to the class.

The computer program may further be executed by the processor to perform the following operations:

performing classification on a displacement vector of an encoded block in a historical motion information list according to a following classification method, the classification method including: in a case that the encoded block satisfies a classification condition of any class of a plurality of classes, adding the displacement vector of the encoded block to the class, and stopping performing classification on the displacement vector of the encoded block.

The processor may be configured to add an index of the displacement vector of the encoded block in the historical motion information list to the class in a case that the encoded block satisfies the classification condition of any class of the plurality of classes.

The processor may be configured to generate a candidate displacement vector list according to the classified displacement vector.

In some embodiments, the processor may be configured to perform any of the following operations:

add, in response to a class that does not include a displacement vector being included in the plurality of classes, a displacement vector included in another class to the candidate displacement vector list, where the another class is a class other than the class in the plurality of classes;

add, in response to a class that does not include a displacement vector being included in the plurality of classes, a first displacement vector to the class, and generating, according to displacement vectors in the plurality of classes, the candidate displacement vector list;

add, in response to a class that does not include a displacement vector being included in the plurality of classes, a second displacement vector to the candidate displacement vector list, where the second displacement vector is a displacement vector of a decoded block that is adjacent to a position of a to-be-decoded block;

add, in response to a class that does not include a displacement vector being included in the plurality of classes, a third displacement vector to the candidate displacement vector list, where the third displacement vector is a displacement vector of a decoded block that is not adjacent to the position of the to-be-decoded block;

add, in response to a class that does not include a displacement vector being included in the plurality of classes, a displacement vector of an encoded block whose encoding order is adjacent to the to-be-encoded block in the historical motion information list to the candidate displacement vector list; and add, in response to a class that does not include a displacement vector being included in the plurality of classes, a displacement vector of a target position in the historical motion information list to the candidate displacement vector list.

The processor may be configured to perform the following operations:

generate, in response to a class that does not include a displacement vector being included in the plurality of classes, a first displacement vector list according to a plurality of first displacement vectors; and determine a first displacement vector corresponding to the class from the first displacement vector list, and adding the first displacement vector corresponding to the class to the candidate displacement vector list.

The processor may be further configured to perform the following operations:

generate, in response to a class that does not include a displacement vector being included in the plurality of classes, a second displacement vector list according to a plurality of second displacement vectors; and determine a second displacement vector corresponding to the class from the second displacement vector list, and adding the second displacement vector corresponding to the class to the candidate displacement vector list.

The processor may be configured to add, in response to the encoded block that is adjacent to the position of the to-be-encoded block does not correspond to any displacement vector, a fourth displacement vector to the candidate displacement vector list, where the fourth displacement vector is a preset displacement vector.

In some embodiments, the processor may be configured to perform the following operations:

determine a target displacement vector corresponding to a to-be-encoded block in the candidate displacement vector list; and encode the to-be-encoded block according to the target displacement vector, and generating an index of the to-be-encoded block according to an order of the target displacement vector in the candidate displacement vector list.

The processor may be configured to perform the following operations:

determine rate-distortion parameters of a plurality of displacement vectors in the candidate displacement vector list; and determine a displacement vector with a smallest rate-distortion parameter as the target displacement vector.

The processor may be configured to, in a case that the encoded block satisfies the classification condition of any class of the plurality of classes, and a displacement vector is included in the class, skipping adding a displacement vector corresponding to the encoded block to the class.

Additionally, the classification condition may include at least one of a size of the decoded block is greater than or equal to a size threshold, a quantity of use times of the displacement vector of the decoded block is greater than a times threshold, and a spatial positional relationship between the decoded block and a to-be-decoded block satisfies a position condition.

In some embodiments, a computer program product is further provided, the computer program product including a computer program, the computer program being stored in a computer-readable storage medium, a processor of a computer device reading the computer program from the computer-readable storage medium, and the processor executing the computer program to cause the computer device to perform the video decoding method or the video encoding method.

A related module described in the embodiments of the disclosure may be implemented in a software manner, or may be implemented in a hardware manner, and the module described can also be set in a processor. Names of the modules do not constitute a limitation on the modules in a specific case.

A person of ordinary skill in the art may understand that all or some of the operations of the foregoing embodiments may be implemented by hardware, or may be implemented by a program instructing relevant hardware. The program may be stored in a computer-readable storage medium. The storage medium may be a read-only memory, a magnetic disk, an optical disc, or the like.

After considering the specification and practicing the implementations of the present disclosure, a person skilled in the art may easily conceive of other implementations of the disclosure. The disclosure is intended to cover any variations, uses, or adaptive changes of the disclosure. These variations, uses, or adaptive changes follow the general principles of the disclosure and include common general knowledge or common technical means in the art, which are not disclosed in the disclosure.

The disclosure is not limited to the structures that are described above and that are shown in the accompanying drawings, and modifications and changes may be made without departing from the scope of the disclosure. The scope of the disclosure is subject only to the appended claims.

What is claimed is:

1. A video decoding method, performed by a computer device, the method comprising:
   performing classification on a displacement vector of a decoded block in a historical motion information list according to a classification method comprising,
   in a case that the decoded block satisfies a classification condition of any class of a plurality of classes, adding the displacement vector of the decoded block to the class, and stopping performing classification on the displacement vector of the decoded block once the displacement vector of the decoded block is added to the class such that the displacement vector is only classified into one of the plurality of classes.

2. The video decoding method according to claim 1, wherein the in a case that the decoded block satisfies a classification condition of any class of a plurality of classes, adding the displacement vector of the decoded block to the class comprises:
   in a case that the decoded block satisfies the classification condition of any class of the plurality of classes, adding an index of the displacement vector of the decoded block in the historical motion information list to the class.

3. The video decoding method according to claim 1, wherein after the stopping performing classification on the displacement vector of the decoded block, the method further comprises:
   generating a candidate displacement vector list according to the classified displacement vector.

4. The video decoding method according to claim 3, wherein the generating a candidate displacement vector list according to the classified displacement vector comprises any one of the following:
   adding, in response to a class that does not comprise a displacement vector being comprised in the plurality of classes, a displacement vector comprised in another class to the candidate displacement vector list, wherein the another class is a class other than the class in the plurality of classes;
   adding, in response to a class that does not comprise a displacement vector being comprised in the plurality of classes, a first displacement vector to the candidate displacement vector list;
   adding, in response to a class that does not comprise a displacement vector being comprised in the plurality of classes, a second displacement vector to the candidate displacement vector list, wherein the second displacement vector is a displacement vector of a decoded block that is adjacent to a position of a to-be-decoded block;

adding, in response to a class that does not comprise a displacement vector being comprised in the plurality of classes, a third displacement vector to the candidate displacement vector list, wherein the third displacement vector is a displacement vector of a decoded block that is not adjacent to the position of the to-be-decoded block;

adding, in response to a class that does not comprise a displacement vector being comprised in the plurality of classes, a displacement vector of a decoded block whose decoding order is adjacent to the to-be-decoded block in the historical motion information list to the candidate displacement vector list; and adding, in response to a class that does not comprise a displacement vector being comprised in the plurality of classes, a displacement vector of a target position in the historical motion information list to the candidate displacement vector list.

5. The video decoding method according to claim 4, wherein the adding, in response to a class that does not comprise a displacement vector being comprised in the plurality of classes, a first displacement vector to the candidate displacement vector list comprises:

generating, in response to a class that does not comprise a displacement vector being comprised in the plurality of classes, a first displacement vector list according to a plurality of first displacement vectors; and determining a first displacement vector corresponding to the class from the first displacement vector list, and adding the first displacement vector corresponding to the class to the candidate displacement vector list.

6. The video decoding method according to claim 4, wherein the adding, in response to a class that does not comprise a displacement vector being comprised in the plurality of classes, a second displacement vector to the candidate displacement vector list comprises:

generating, in response to a class that does not comprise a displacement vector being comprised in the plurality of classes, a second displacement vector list according to a plurality of second displacement vectors; and determining a second displacement vector corresponding to the class from the second displacement vector list, and adding the second displacement vector corresponding to the class to the candidate displacement vector list.

7. The video decoding method according to claim 4, wherein before the adding a second displacement vector to the candidate displacement vector list, the method further comprises:

adding, in response to the decoded block that is adjacent to the position of the to-be-decoded block being not corresponding to any the displacement vector, a fourth displacement vector to the candidate displacement vector list, wherein the fourth displacement vector is a preset displacement vector.

8. The video decoding method according to claim 3, wherein after the generating a candidate displacement vector list according to the classified displacement vector, the method further comprises:

determining, according to an index of a to-be-decoded block, a target displacement vector corresponding to the to-be-decoded block in the candidate displacement vector list; and decoding the to-be-decoded block according to the target displacement vector.

9. The video decoding method according to claim 1, wherein the classification condition comprises at least one of the following:

a size of the decoded block is greater than or equal to a size threshold, a quantity of use times of the displacement vector of the decoded block is greater than a times threshold, and a spatial positional relationship between the decoded block and a to-be-decoded block satisfies a position condition.

10. The video decoding method according to claim 1, wherein the classification method further comprises:

in a case that the decoded block satisfies the classification condition of any class of the plurality of classes and a displacement vector is comprised in the class, skipping adding the displacement vector of the decoded block to the class.

11. A video decoding apparatus comprising:

at least one memory configured to store program code; and at least one processor configured to read the program code and operate as instructed by the program code, the program code comprising:

decoded block classification code configured to cause at least one of the at least one processor to perform classification on a displacement vector of a decoded block in a historical motion information list according to a following classification method, the classification method comprising: in a case that the decoded block satisfies a classification condition of any class of a plurality of classes, adding the displacement vector of the decoded block to the class, and stopping performing classification on the displacement vector of the decoded block once the displacement vector of the decoded block is added to the class such that the displacement vector is only classified into one of the plurality of classes.

12. The video decoding apparatus according to claim 11, wherein the decoded block classification code is further configured to cause at least one of the at least one processor to skip adding the displacement vector of the decoded block into the class during classification if the decoded block satisfies the classification condition of any class of the plurality of classes, and a displacement vector is included in the class.

13. The video decoding apparatus according to claim 11, wherein the decoded block classification code is further configured to cause at least one of the at least one processor to:

add, in a case that the decoded block satisfies the classification condition of any class of the plurality of classes, an index of the displacement vector of the decoded block in the historical motion information list to the class.

14. The video decoding apparatus according to claim 11, the program code further comprising:

first candidate displacement vector list generation code configured to cause at least one of the at least one processor to generate a candidate displacement vector list according to the classified displacement vector.

15. The video decoding apparatus according to claim 14, wherein first candidate displacement vector list generation code is further configured to cause at least one of the at least one processor to perform any one of:

add, in response to a class that does not comprise a displacement vector being comprised in the plurality of classes, a displacement vector comprised in another class to the candidate displacement vector list, wherein the another class is a class other than the class in the plurality of classes;

add, in response to a class that does not comprise a displacement vector being comprised in the plurality of classes, a first displacement vector to the candidate displacement vector list;

add, in response to a class that does not comprise a displacement vector being comprised in the plurality of classes, a second displacement vector to the candidate displacement vector list, wherein the second displacement vector is a displacement vector of a decoded block that is adjacent to a position of a to-be-decoded block;

add, in response to a class that does not comprise a displacement vector being comprised in the plurality of classes, a third displacement vector to the candidate displacement vector list, wherein the third displacement vector is a displacement vector of a decoded block that is not adjacent to the position of the to-be-decoded block;

add, in response to a class that does not comprise a displacement vector being comprised in the plurality of classes, a displacement vector of a decoded block whose decoding order is adjacent to the to-be-decoded block in the historical motion information list to the candidate displacement vector list; and add, in response to a class that does not comprise a displacement vector being comprised in the plurality of classes, a displacement vector of a target position in the historical motion information list to the candidate displacement vector list.

16. The video decoding apparatus according to claim 15, wherein the first candidate displacement vector list generation code is further configured to cause at least one of the at least one processor to:

generate, in response to a class that does not comprise a displacement vector being comprised in the plurality of classes, a first displacement vector list according to a plurality of first displacement vectors;

determine a first displacement vector corresponding to the class from the first displacement vector list; and add the first displacement vector corresponding to the class to the candidate displacement vector list.

17. The video decoding apparatus according to claim 15, wherein the first candidate displacement vector list generation code is further configured to cause at least one of the at least one processor to:

generate, in response to a class that does not comprise a displacement vector being comprised in the plurality of classes, a second displacement vector list according to a plurality of second displacement vectors;

determine a second displacement vector corresponding to the class from the second displacement vector list; and add the second displacement vector corresponding to the class to the candidate displacement vector list.

18. The video decoding apparatus according to claim 15, wherein the first candidate displacement vector list generation code is further configured to cause at least one of the at least one processor to:

add, in response to the decoded block that is adjacent to the position of the to-be-decoded block being not corresponding to any the displacement vector, a fourth displacement vector to the candidate displacement vector list, wherein the fourth displacement vector is a preset displacement vector.

19. The video decoding apparatus according to claim 14, the program code further comprising:

first target displacement vector determining code configured to cause at least one of the at least one processor to:

determine, according to an index of a to-be-decoded block, a target displacement vector corresponding to the to-be-decoded block in the candidate displacement vector list; and decode the to-be-decoded block according to the target displacement vector.

20. A non-volatile computer readable storage medium, storing computer code that when executed by at least one processor causes at least one of the at least one processor to:

perform classification on a displacement vector of a decoded block in a historical motion information list according to a classification method comprising:

in a case that the decoded block satisfies a classification condition of any class of a plurality of classes, adding the displacement vector of the decoded block to the class, and stopping performing classification on the displacement vector of the decoded block once the displacement vector of the decoded block is added to the class such that the displacement vector is only classified into one of the plurality of classes.

* * * * *